US012634314B2

(12) United States Patent
Baikalov et al.

(10) Patent No.: US 12,634,314 B2
(45) Date of Patent: May 19, 2026

(54) ATTACK PATH MONITORING AND RISK MITIGATION IN IDENTITY SYSTEMS

(71) Applicant: SEMPERIS LTD., Ramat-Gan (IL)

(72) Inventors: Igor Baikalov, Thousand Oaks, CA (US); Guy Teverovsky, Kefar Sava (IL); Gil Kirkpatrick, Boise, ID (US); Elad Shamir, Spring, TX (US)

(73) Assignee: SEMPERIS LTD., Ramat-Gan (IL)

( * ) Notice: Subject to any disclaimer, the term of this patent is extended or adjusted under 35 U.S.C. 154(b) by 153 days.

(21) Appl. No.: 18/213,337

(22) Filed: Jun. 23, 2023

(65) Prior Publication Data

US 2024/0031391 A1     Jan. 25, 2024

Related U.S. Application Data

(60) Provisional application No. 63/391,433, filed on Jul. 22, 2022.

(51) Int. Cl.
*H04L 9/40* (2022.01)
(52) U.S. Cl.
CPC ........ *H04L 63/1425* (2013.01); *H04L 63/145* (2013.01)
(58) Field of Classification Search
CPC ............... H04L 63/1425; H04L 63/145; H04L 63/1433; H04L 63/1416; H04L 63/20; H04L 63/1441; H04L 63/1466; H04L 41/14; H04L 63/1408; G06F 21/577; G06F 2221/034; G06F 11/0793
See application file for complete search history.

(56) References Cited

U.S. PATENT DOCUMENTS

| | | | |
|---|---|---|---|
| 9,043,869 B2 | 5/2015 | Thomas | |
| 2003/0159069 A1 | 8/2003 | Choi | |
| 2009/0025084 A1 | 1/2009 | Siourthas | |
| 2009/0154360 A1* | 6/2009 | Asher ..................... H04L 45/12 370/238 |
| 2012/0096547 A1 | 4/2012 | Barau | |
| 2012/0159624 A1 | 6/2012 | Konig | |
| 2016/0050204 A1 | 2/2016 | Anderson | |
| 2016/0088000 A1 | 3/2016 | Siva Kumar | |
| 2017/0031018 A1* | 2/2017 | Takahashi ............. G01S 13/931 |

(Continued)

OTHER PUBLICATIONS

Erdogan et al., "A Systematic Mapping Study on Approaches for AI-Supported Security Risk Assessment," 2021 IEEE 45th Annual Computers, Software, and Applications Conference (Compsac) Year: 2021 | Conference Paper | Publisher: IEEE.*

(Continued)

*Primary Examiner* — Roderick Tolentino
(74) *Attorney, Agent, or Firm* — Lowenstein Sandler LLP

(57) ABSTRACT

A method includes generating, by a processing device, at least one security zone comprising a set of objects of a computing environment using at least one identity system, and identifying, by the processing device, a set of attack paths leading to the at least one security zone. Each attack path of the set of attack paths includes a respective target object accessible via a respective source object through at least one control relationship, and each target object is included within the set of objects of the at least one security zone. The method further includes performing, by the processing device based on the set of attack paths, attack path monitoring and risk mitigation.

18 Claims, 8 Drawing Sheets

(56)  References Cited

U.S. PATENT DOCUMENTS

| | | | |
|---|---|---|---|
| 2017/0078314 A1* | 3/2017 | Mohanty | H04L 63/1425 |
| 2018/0032724 A1* | 2/2018 | Tang | G06F 21/552 |
| 2020/0177617 A1* | 6/2020 | Hadar | G06F 21/552 |
| 2020/0244673 A1 | 7/2020 | Stockdale | |
| 2020/0412758 A1 | 12/2020 | Trivellato | |
| 2021/0075822 A1 | 3/2021 | Chung | |
| 2021/0149405 A1* | 5/2021 | Kim | B60W 60/00256 |
| 2021/0243208 A1 | 8/2021 | Rubin | |
| 2021/0297398 A1* | 9/2021 | Gupta | G06F 9/45558 |
| 2021/0351980 A1* | 11/2021 | Huffman | H04L 63/1416 |
| 2022/0060507 A1* | 2/2022 | Crabtree | G06F 16/2477 |
| 2022/0092177 A1* | 3/2022 | Herwono | G06F 21/562 |
| 2023/0208871 A1* | 6/2023 | Yellapragada | G06N 3/045 |
| | | | 726/25 |

OTHER PUBLICATIONS

Yuan et al., "An Attack Path Generation Methods Based on Graph Database," 2020 Chinese Automation Congress (CAC) Year: 2020 | Conference Paper | Publisher: IEEE.*

PCT Notification of Transmittal of the International Search Report and the Written Opinion of the International Searching Authority for PCT Application No. PCT/US2023/027156, 12 pages, mailed Oct. 16, 2023.

The extended European search report for EP Application for 23843553. 1, dated Feb. 25, 2026, 11 pages.

\* cited by examiner

START

Obtain input data from a set of data sources associated with a computing environment
410

Generating, based on the input data, at least one security zone
420

Identify a set of attack paths leading to the at least one security zone
430

Perform attack path monitoring and risk mitigation
440

END

ATTACK PATH MONITORING AND RISK MITIGATION IN IDENTITY SYSTEMS

CROSS-REFERENCE TO RELATED APPLICATION(S)

The present application claims the benefit of U.S. Provisional Patent Application No. 63/391,433, filed on Jul. 22, 2022 and entitled "ATTACK PATH MONITORING AND RISK MITIGATION IN IDENTITY SYSTEMS", the entire contents of which are herein incorporated by reference.

TECHNICAL FIELD

The disclosure is generally related to cybersecurity, and more specifically to attack path monitoring and risk mitigation in identity systems.

BACKGROUND

A computing environment (e.g., network) can include a number of objects. Examples of objects of a computing environment include security principals and computing resources (e.g., databases or applications). A security principal is an object that can be authenticated by a computing environment. Examples of security principals include user accounts, computer accounts, applications, etc. User account and computer accounts can be grouped to create groups of accounts (e.g., groups of user accounts and/or groups of computer accounts). Groups of accounts can be arbitrarily nested. Objects can be further divided into respective containers. A container refers to a logical grouping of objects within the computing environment. Objects of a container can be further grouped into respective sub-containers. A sub-container can be created to provide a hierarchical and/or logical structure to objects within a container for more precise object management. The behavior of a group of objects (e.g., a container or sub-container) can be managed or controlled. For example, a group of objects can be assigned a set of configuration rules, such as a set of group policy settings, for controlling the behavior of objects grouped therein (e.g., static management or control). As another example, configuration groups can be dynamically managed or controlled based on factors such as, e.g., object properties.

A security principal (e.g., user account or computer account), or groups of accounts (e.g., group of user accounts and/or group of computer accounts) can be identified by a unique security identifier, which is a unique value typically assigned by the computing environment. A security principal can be assigned permissions for accessing a computing resource (e.g., a file system object such as a file or directory) and/or performing actions with respect to the resource. For example, permissions for a resource of the computing environment can be maintained within a resource-specific authorization policy. Illustratively, an authorization policy can be implemented as an access control list (ACL), a role-based access control (RBAC) policy, etc. For example, an ACL can include access control entries (ACEs) specifying permissions and security principals to which the respective permissions are granted. Permissions can include read, write, execute, delete, etc.

User accounts identify respective users by respective user identifiers (e.g., usernames or security identifiers). Computer accounts can identify which computers within the computing environment are members of respective containers of the computing environment. Computer accounts can be used to determine whether a computer can join a container, sub-container, etc., and can be used for computer authentication. Groups of accounts include one or more accounts and can be used to facilitate security permission management within the computing environment (e.g., by granting permissions to a group of user accounts instead of individual user accounts).

The computing environment can use at least one identity system. An identity system is a computer memory system that stores identity data related to objects of the computing environment. For example, user identity data for a user can include a username, unique identifier, group membership, credential verification information, etc. An administrator of the computing environment can use an identity system to add objects to the computing environment, manage access privileges to objects within the computing environment, etc. An identity system can function as a centralized mechanism to authenticate objects and may authorize or restrict objects from performing certain tasks within the computing environment. Illustratively, when a user attempts to access an application, the application can use data from the identity store to determine that the user has access privileges for the application. Multiple identity systems can be used in a hybrid identity solution, for example, when a user authenticates against one identity system to access resources in another identity system or governed/bound to another identity system.

BRIEF DESCRIPTION OF THE DRAWINGS

The included drawings are for illustrative purposes and serve to provide examples of possible structures and operations for the disclosed inventive systems, apparatus, methods, and computer-readable storage media. These drawings in no way limit any changes in form and detail that may be made by one skilled in the art without departing from the spirit and scope of the disclosed implementations.

DETAILED DESCRIPTION

Figure 1:
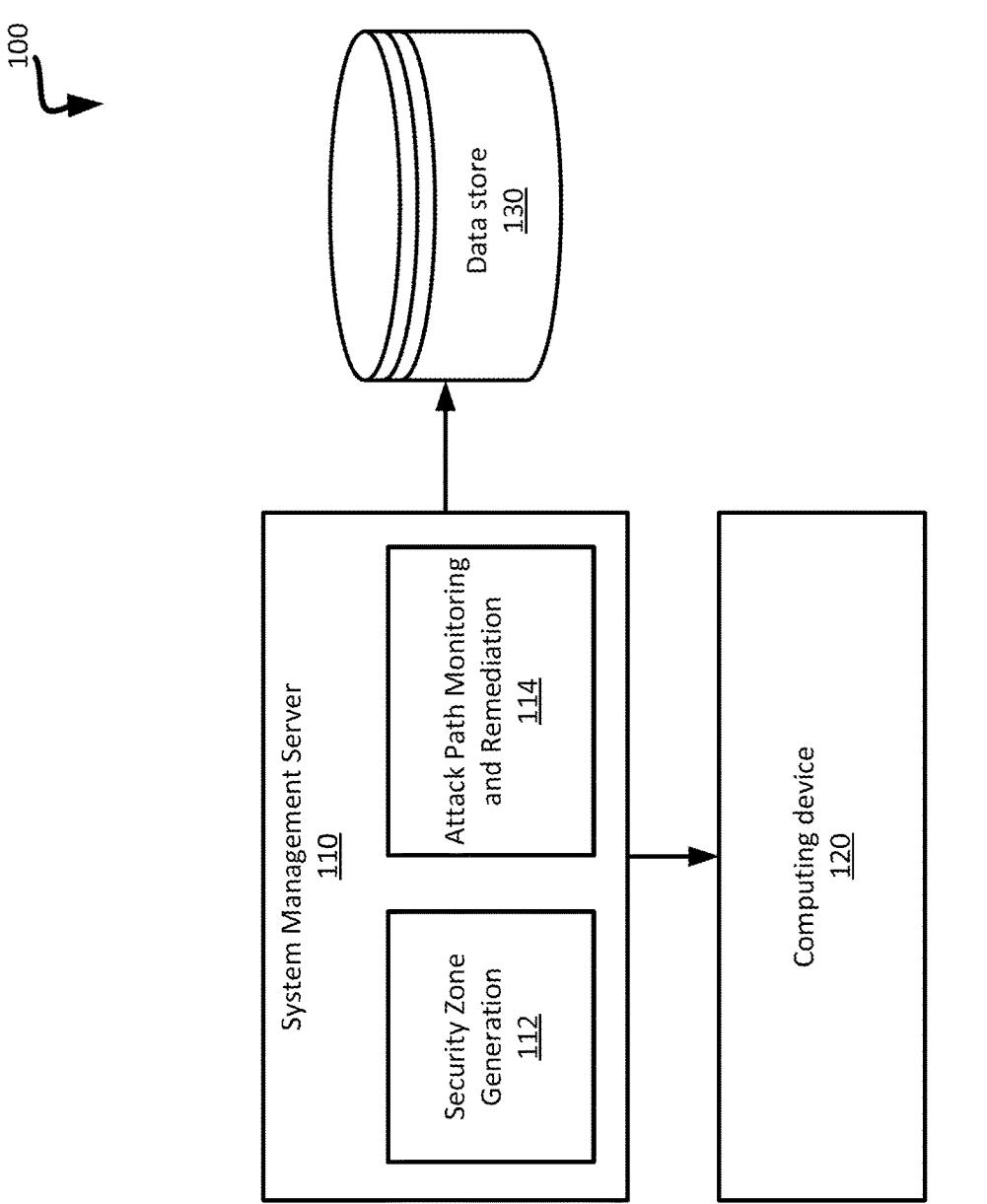
FIG. 1 is a block diagram of an example computing environment for implementing attack path monitoring and risk mitigation in identity systems, according to some implementations.

Described herein are systems and methods to implement attack path monitoring and risk mitigation in identity systems. A malicious entity ("attacker") can attempt to gain access to a target object of a computing environment. For example, an attacker can attempt to gain access to the target object via an exploitable attack path (e.g., gain control over the target object). An attack path refers to a chain of relationships from a source object (i.e., starting object or entry point of the chain) to the target object. One example of a relationship is a control relationship. A control relationship is a relationship in which an object ("controlling object") can perform certain actions (which can be specific to the target object type) with respect to another object ("controlled object"). A control relationship ultimately allows the controlling object to act on behalf of the controlled object (e.g., if the controlled object is a security principal). Another example of a relationship is an activity relationship. An activity relationship represents some potential activity between objects. For example, if one object is a user and another object is a computer, then an activity relationship can be a log on event in which the user logs onto the computer. Further details regarding relationships will be described below.

An attacker can hide malicious activity while traversing an attack path from detection by avoiding any detection mechanism(s) implemented by the computing environment for detecting attacks in real-time. For example, an attacker can disable a change tracking feature by reconfiguring the change tracking feature, interfering with communications with the change tracking feature, or otherwise modifying change tracking software in a way that renders the change tracking feature nonfunctional. The attacker can then reenable the change tracking feature after completing the malicious activity (e.g., gaining access to the target object). Accordingly, the ability to hinder the ability of an attacker from accessing a target object can be improved by determining, before an attack, if any changes can be made within the computing environment that can progress along at least one attack path.

If multiple attack paths to a target object exist, an attacker launching an attack to access the target object may choose to select an optimal attack path among the multiple attack paths. With this assumption, making it more costly to access such attack paths can help to slow down or prevent the attack from happening in the first place. However, the attack path landscape can actively change due to legitimate modifications to the computing environment. For example, the addition of new objects within the computing environment or changes to existing objects within the computing environment can, in turn, generate new control relationships between objects that generate new attack paths, modify existing attack paths, and/or remove existing attack paths.

Aspects of this disclosure address the above and other deficiencies by providing technology that implements attack path monitoring and risk mitigation in identity systems. Attack path monitoring and computing environment risk mitigation can be performed by an identity system management server of the computing environment to protect at least one identity system (e.g., identity store) from attack. Implementations described herein include technology that enhances the ability of the management server to identify actual sources of attack risk within a computing environment identity system (e.g., potential and/or actual sources of attack risk), and takes measures to address the sources of attack risk.

In some implementations, a computing environment can be represented by at least one identity graph. An identity graph is a data structure including a set of vertices connected by directed edges. Each vertex can represent an object of the computing environment, and each edge can represent a relationship between the objects represented by the vertices connected by the edge. A sequence of edges can represent at least a portion of an attack path connecting a source vertex to a target vertex. A source vertex represents an initial object of an attack path (e.g., security principal) and a target vertex represents the object of the attack path subject to an attack (e.g., computing device). The vertices and edges of the identity graph can have a Create, Read, Update and Delete (CRUD) lifecycle. Each vertex can be uniquely identifiable and can have an inherent likelihood of initial compromise based on the computing environment and/or vertex configuration. To implement attack path monitoring and risk management, an identity system management server can generate at least one security zone. A security zone refers to a grouping of objects that share a set of characteristics. Examples of objects can include users, computers, groups of users, groups of computers, applications, etc. For example, the set of characteristics can include a criticality (e.g., importance) in the computing environment. Criticality can be assigned to a security zone, and objects of the security zone can inherit the criticality assigned to the security zone. The criticality of individual objects within the security zone can be modified (e.g., increased), if needed. Other characteristics of the set of characteristics can include related functionality, physical location, etc. In some implementations, at least one security zone generated by the identity system management server includes the most critical objects within the computing environment.

To generate a security zone, the identity system management server can obtain an initial set of objects having a set of characteristics (e.g., criticality within the computing environment). For example, the initial set of objects can be a default list of objects defined within the computing environment. As another example, the initial set of objects can be received from an external system (e.g., via a graphical user interface (GUI)). Illustratively, the initial set of objects can include at least one of a group of administrators, a group of application servers, etc. After identifying the initial set of objects, a variety of different methods can be used to finish generating the security zone. Examples of methods that can be used to finish generating the security zones will be described in further detail herein.

After generating the at least one security zone, the identity system management server can identify a set of attack paths. Each attack path of the set of attack paths leads into a respective security zone, such that the target object of each attack path is an object within the at least one security zone.

The identity system management server can perform attack path monitoring and risk mitigation to determine which attack path(s) of the set of attack paths should be addressed to reduce attack risk within the computing environment. For example, the identity system management server can utilize a number of risk metrics (e.g., risk scores) for implementing attack path monitoring and risk mitigation in identity systems. One type of risk metric is an attack path risk metric. An attack path risk metric is a risk metric (e.g., score) assigned to an attack path quantifying a risk to the computing environment if the attacker successfully navigates the attack path to exploit the target object. An attack path risk metric can have a number of components.

For example, one component of an attack path risk metric for an attack path can be a cost of the attack path traversal ("attack path cost"). The attack path cost for an attack path having a source object and a target object is a value indicative of a cost for an attacker to proceed from the source object to the target object. A lower attack path cost means higher risk of the attack path.

The attack path cost for an attack path can be determined from the cost of exploiting the control relationships between the vertices of the attack path. A control relationship cost for a control relationship between a pair of objects is a value indicative of a cost for an attacker to progress from one object of the pair to the other object of the pair via the control relationship. Each control relationship cost can be determined from a combination of factors. For each factor, a numeric value can be assigned to each object to represent the factor (e.g., relative numeric value representing relative impact of the factor on the object) Examples of factors include difficulty of the traversal via the control relationship (e.g., ease of exploitation and/or number of extra steps) and/or observability of the traversal via the controller relationship. Observability can be determined by the number of changes and/or artifacts (e.g., event logs) that are generated for the traversal. For example, a zero-cost traversal can be one in which no change is required, and no artifacts are generated (e.g., group membership), while a higher cost edge traversal can include one or more highly visible changes and/or artifacts. Artifacts can include metadata tracking object changes (e.g., object property changes). For example, artifacts can capture an addition of a user to a group, granting a user access (control) of an object, etc.

As another example, another component of an attack path risk metric for an attack path can be initial exploitability of the source object of the attack path (e.g., the security principal). The initial exploitability of a source object refers to an inherent likelihood of initial compromise of the source object. The initial exploitability of a source object can be determined from one or more factors related to the computing environment and/or object configuration. Examples of factors include a set of configuration rules of an object (e.g., user/computer) based on a central policy/configuration management system (e.g., some computers are more hardened than others), a location (e.g., physical location) of the object, whether the object is exposed to the Internet or wide area network (WAN), user role as some roles may be more susceptible to attacks than others (e.g., a user that receives data from many external parties can have a greater susceptibility of receiving malware), an amount of security awareness training, and security solutions deployed with respect to the object (e.g., antimalware software installed on a workstation). A numeric value can be assigned to each object to represent the initial exploitability of the object (e.g., relative numeric value representing relative initial exploitability).

As yet another example, another component of an attack path risk metric for an attack path can be criticality of the target object of the attack path. The criticality of the target object of the attack path can relate to an importance of the target object to an organization or enterprise. Generally, the criticality of an object can be inherited from the security zone(s) it belongs to (i.e., a default criticality). However, the criticality of specific objects can be overridden to a lower or higher value if needed. Relative numeric values can be assigned to resources to represent their respective criticality. Further details regarding determining risk metrics, attack path costs and control relationship costs will be described in further detail herein.

In addition to the attack path risk metric, another type of risk metric is an object risk metric. An object risk metric is a risk metric for an object derived from the attack path risk metrics of all attack paths that include that object.

In addition to the attack path and object risk metrics, another type of risk metric is a security zone risk metric. For example, the security zone risk metric for a security zone represents an aggregation of the attack path risk metrics of all attack paths leading to the security zone.

In addition to the attack path, object and security zone risk metrics, another type of risk metric is a computing environment risk metric. A computing environment risk metric for a computing environment represents an aggregation of the security zone risk metrics for all security zones of the computing environment.

In some implementations, performing attack path monitoring and risk mitigation in identity systems includes performing static attack path monitoring and risk mitigation. Static attack path monitoring and risk mitigation in identity systems involves identifying at least one attack path of the computing environment that contributes the most to the overall risk of the computing environment.

To perform static attack path monitoring and computing environment risk mitigation, the identity system management server can obtain a set of attack path risk metrics, a set of security zone risk metrics from the set of attack path risk metrics, and a computing environment risk metric from the set of security zone risk metrics, as described in further detail above.

The identity system management server can then determine, for each attack path, a risk impact of the attack path on the computing environment risk metric based on the attack path risk metric. For example, the identity system management server can, for each attack path, model the removal or modification of the attack path and recalculate the computing environment risk metric (i.e., a new aggregation of the security zone risk metrics for all security zones of the computing environment) to obtain a modified computing environment risk metric.

The identity system management server can then identify, from each risk impact, at least one attack path among the set of attack paths having the greatest risk impact on the computing environment. For example, the identity system management server can, for each attack path, determine an amount of risk reduction by subtracting the modified computing environment risk metric from the original computing environment risk metric, and identify the at least one attack path that, when modified or removed, has the greatest amount of risk reduction.

The identity system management server can address the at least one attack path having the greatest impact on the computing environment. In some implementations, addressing the at least one attack path can include removing the at least one attack path. In some implementations, addressing the at least one attack path can include modifying the at least one attack path (e.g., altering at least one control relationship between at least one pair of objects within the attack path or reducing initial exploitability of the source object).

Additionally or alternatively, in some implementations, performing attack path monitoring and risk mitigation includes performing dynamic attack path monitoring and risk mitigation (e.g., continuously or in real-time). For example, the identity system management server can perform dynamic attack path monitoring and risk mitigation by detecting any changes (including proposed changes that have not been applied to the computing environment) with respect to a set of attack paths of the computing environment. The changes can be detected by analyzing the input data (e.g., replication data, event logs or access provisioning requests). In some implementations, the change can be a change that triggers an update to at least one attack path risk metric of at least one attack path. For example, a change can be a change to a control relationship, a change to security principal exploitability, a change to a security zone definition, etc. In some implementations, the change can be a change that generates at least one new attack path.

The identity system management server can then determine, for each change, a risk of allowing the change, and determine, for each change, whether the risk satisfies a risk threshold condition. In some implementations, determining whether the risk of a change satisfies a risk threshold condition includes determining whether the change causes an object of a security zone to enter into a higher risk category (e.g., from high risk to critical risk). In some implementations, determining whether the risk of a change satisfies a risk threshold condition includes determining whether the change results in a significant or unacceptable increase in risk.

If the identity system management server determines that risk satisfies the risk threshold condition, then the identity system management server can address the at least one change (otherwise the identity system management server can implement the at least one change). For example, to address a change, the identity system management server can generate an alert. The alert may be in the form of a notification on the dashboard of an administrator's account, an email to an administrator, a text message, a notification on a smartphone, etc. Additionally or alternatively, to address a change, the identity system management server can model the change before applying the change, and determine whether to prevent the change from being applied. For example, if the identity system management server determines that a change results in a significant or unacceptable increase in risk, then the identity system management server can block or roll back the change to prevent the change from being implemented. Additionally or alternatively, to address a change, the identity system management server can deny access to an object (e.g., user access to a resource) if access to the object would result in an unacceptable increase in risk.

The static and dynamic attack path monitoring and risk mitigation described above can be used to identify and mitigate the risk of potential attack. To identify and mitigate an actual attack, implementations described herein can also perform real-time attack path monitoring and risk mitigation in identity systems with behavioral analytics. Behavioral analytics refers to an anomaly detection technique that amplifies anomalous behavior over variations of normal, legitimate activity. Examples of anomalous behavior can include a user logging onto a computer that has never been used before, an abnormal number of failed logon attempts, temporal anomalies (e.g., user activity at times when there is normally no activity), migrating an atypical amount of data from one data store to another data store, access to or from the object that has never been seen before, etc.

Anomalous behavior can be considered an indicator of an attack or other malicious activity. For example, multiple logon anomalies on a high-risk attack path can be indicative of an attack in progress. However, it may be the case that a small number of objects or security zones with a computing environment are considered highly critical. Since most objects or security zones within a computing environment may have low criticality, it may be computationally expensive and/or impractical to address every single anomaly that is detected within the computing environment. For example, a large amount of anomalous behavior can be irrelevant noise due to human error. Moreover, even if some anomalous behavior detectable by the processing device is indicative of an attack, the risk of danger to the computing environment due to the attack can be low (e.g., the attack gains access to a low-risk object such as a printer). Additionally, another impact of low risk events is on security analysts. For example, a security analyst may overlook a high risk event alert within a large volume of low risk event alerts.

To address at least the above-noted drawbacks of behavioral analytics, in some implementations, the identity system management server can detect anomalous behavior originating from an attack path of a set of attack paths of a computing environment. If the identity system management server determines that a risk associated with the attack path satisfies the threshold condition, this means that the anomalous behavior is sufficiently high risk, and the identity system management server can address the anomalous behavior. The risk can be determined from the attack path risk metric for the attack path. Otherwise, if the identity system management server determines that the risk does not satisfy the threshold condition, this means that the anomalous behavior is not sufficiently high risk, and the identity system management server can ignore the anomalous behavior, therefore reducing false positives in attack detection. Additionally or alternatively, the level of risk of a scenario can dictate the urgency of the response. For example, a real-time alert can be generated for a high-risk scenario, and a log entry can be generated for a low-risk scenario).

In some implementations, the identity system management server utilizes an identity risk fabric to reduce false positives in attack path monitoring and attack detection. The identity risk fabric can correspond to a static risk plane reflecting a current risk landscape. A static risk plane can be defined by a combination of security zones with attack paths reflecting a current configuration. Every object (e.g., security principal) in a static risk plane can have a respective risk score determined by the attack paths that traverse the object. Activity data, such as directory changes or login events, can be overlaid on the identity risk fabric to generate a dynamic risk score which can be used to detect risk activities in near real time. The identity risk fabric can modulate legitimate changes in the environment and notoriously noisy behavioral indicators to reduce noise and prioritize (e.g., amplify) changes and anomalies affecting high risk or critical objects, reducing false positives in detecting potential attacks.

There may be risk amplification along an attack path. For example, the attack path risk metric for an attack path can be a function of the number of objects of which anomalous behavior has been detected ("anomalous objects"). For example, an attack path including two anomalous objects can have a greater amount of risk than an attack path including a single anomalous object, but a smaller amount of risk than an attack path including more than two anomalous objects. There may not be a linear relationship between the number of anomalous objects and the amount of risk. For example, there may be an exponential relationship between the number anomalous objects and the amount of risk.

The identity system management server can further analyze the intensity (e.g., timing) of changes in the identity system affecting the attack path, which can amplify the corresponding attack path risk metric. For example, many changes performed in a short period of time can indicate a high risk, even if the changes themselves are not individually risky. Further details regarding implementing attack path monitoring and risk mitigation in identity systems will now be described below with reference to FIGS. 1-6.

Some computer systems only work with a single identity system, such as an on-premises system or a remote system (e.g., cloud system). However, some computer systems can utilize a hybrid identity system. A hybrid identity system refers to a combination of identity systems used in an identity and access management infrastructure. A hybrid identity system can leverage both on-premises and remote (e.g., cloud) identity systems to manage identities, authentication, and authorization for a computer system. For example, a hybrid identity system can include a first identity system linked to a second identity system. The first identity system can be, e.g., an on-premises identity system and the second identity system can be, e.g., a remote identity system (or vice versa). Hybrid identity systems can be used to enable single sign-on (SSO) in which a user can use on-premises login credentials to access remote services to eliminate the need for multiple login credentials, centralized identity management (e.g., user provisioning, user deprovisioning and access management), etc.

However, some computer systems may not be able to detect hybrid attacks in which an attacker hijacks an identity in a first store to exploit resources in a second store linked to the first store. Implementations described herein can be used to perform attack risk monitoring and risk mitigation with respect to hybrid identity systems in which at least a first identity system is linked to at least a second identity system. For example, implementations described herein can be used to trace attack paths across a hybrid identity system. In some instances, a link between the first identity system and the second identity system is explicit (e.g., an on-premises system directory system account linked to a remote system directory system account). In some instances, a link between the first identity system and the second identity system is not explicit. For example, a user can have a directory system account linked to an account that utilizes an authentication process to enable SSO, such as Security Assertion Markup Language (SAML) authentication. In some instances, a link between the first identity system and the second identity system is completely distinct. In such situations, identities can be correlated using some other scheme.

Implementations described herein can utilize an in-memory distributed large graph processing engine. An identity-centric graph schema can be designed to facilitate federated processing of individual identity systems with centralized analysis of inter-identity-system relationships for hybrid identity system protection.

Implementations described herein provide for a variety of technical improvements. For example, implementations described herein can provide for a top-down approach that first identifies high-level targets, and then traverses control relationships to identify security principals that can exploit these relationships to gain control of the environment. Such a top-down approach can be more computationally efficient that other approaches by reducing the number of vertices or nodes being analyzed. Such a top-down approach is also defense-minded by identifying a security perimeter that is monitored and protected.

As another example, implementations described herein can utilize cost models for control relationships that are scored on multiple factors such as complexity (e.g., the level of skills and effort needed for exploitation), artifacts (e.g., traces of exploitation left in data items such as audit logs or configuration changes), extra steps (e.g., additional exploitation steps that are needed), etc. The risk of a specific attack path can be inversely proportional to the total cost of the relationships in the path. For example, group membership has zero cost as it doesn't require any effort to exploit and doesn't leave any traces, so the risk is high.

As yet another example, implementations described herein can enable the use of a default cost profile that assumes an attack with average attacking skills and average detectability, or the use of a custom cost profile that customizes attacking skills and/or detectability. For example, a custom cost profile can be tuned to focus on attackers with a high level of sophistication who are attempting to perform a discreet attack, attackers who are attempting to perform an attack without discretion (e.g., publicity attacks), etc.

As yet another example, implementations described herein can employ multiple security zones. For example, the most critical components of a computing system can include components that control security and identity infrastructure (e.g., Tier 0 assets). Such components have to be protected at all costs. Implementations described herein employ various approaches that can be used to define such critical components of a computing system, such as zero-cost attack path analysis, as well as to detect and risk-score security principals that have control relationships over such critical components. Implementations described herein can further enable users to define additional security zones that are each defined with a respective criticality level.

As yet another example, implementations described herein can utilize an efficient data collection format. For example, identity system data collection (e.g., directory service data collection) can be limited by available bandwidth that cannot be significantly improved without impact production operations. Implementations described herein can utilize a compact data serialization format for storing data as compared to, e.g., XML (eXtensible Markup Language or JSON (JavaScript Object Notation). For example, the compact data serialization format can be a protocol buffers (e.g., Protobuf) data serialization format.

FIG. 1 is a block diagram of an example computing environment 100 for implementing attack path monitoring and risk mitigation in identity systems, according to some implementations. It should be noted that other arrangements for computing environment 100 are possible. The computing environment 100 can include objects. Examples of objects include security principals (e.g., users and computers), groups of users and/or groups of computers) and computing resources. The computing environment 100 can use at least one identity server. Multiple identity systems can be used in a hybrid identity solution, for example, when a user authenticates against one identity system to access resources in another identity system.

In some implementations, the objects of the computing environment 100 can be represented at least one identity graph. As previously discussed, an identity graph is a data structure including a set of vertices connected by directed edges. Each vertex can represent at least one object of the computing environment, and each edge can represent a relationship (e.g., a control relationship or activity relationship) between the objects represented by the vertices connected by the edge. A sequence of edges can represent at least a portion of an attack path connecting a source vertex to a target vertex. A source vertex represents an initial object of an attack path (e.g., security principal) and a target vertex represents the object of the attack path subject to an attack (e.g., computing device). A number of different attack paths can exist between the source vertex and the target vertex. Examples of attack path representations (e.g., identity graphs) will be described below with reference to FIGS. 2-3.

The computing environment 100 can include an identity system management server 110, at least one computing device 120 and at least one data store 130 communicably coupled to the identity system management server 110. The identity system management server 110 can communicate with the computing device 120 to implement attack path monitoring and risk management, as will be described in further detail below. Data generated by the identity system management server 110 can be stored in a data store 130. Data store 130 may be any data storage device or a combination of data storage devices that are capable of storing data.

The identity system management server 110 can utilize a number of risk metrics (e.g., risk scores) for implementing attack path monitoring and risk mitigation in identity systems. As described above, examples of risk metrics include attack path risk metrics of attack paths of the computing environment, object risk metrics of objects of the computing environment, security zone risk metrics of security zones of the computing environment, and a computing environment risk metric. An attack path risk metric for an attack path can have a number of components (e.g., attack path cost, initial exploitability of the source object of the attack path and/or criticality of the target object of the attack path).

To implement attack path monitoring and risk management, the identity system management server 110 can include a security zone generation component 112. The security zone generation component 112 can generate at least one security zone. Each security zone defines a respective grouping of objects that share a set of characteristics (e.g., criticality in the computing environment 100). For example, the at least one security zone can include a security zone of the most critical objects within the computing environment 100. It is possible for an object to be included in more than one security zone.

To generate a security zone, the security zone generation component 112 initializes the security zone to include an initial set of objects having a set of similar characteristics (e.g., criticality within the computing environment). For example, the initial set of objects can include a default list of objects defined with the computing environment. As another example, the initial set of objects can be received from an external system (e.g., via a GUI). Illustratively, the initial set of objects can include at least one of a group of administrators, a group of application servers, etc. After identifying the initial set of objects, a variety of different methods can be used to finish generating the security zone.

In some implementations, the security zone generation component 112 can generate a security zone by performing a number of object addition iterations. During each object addition iteration, the security zone generation component 112 can, for each object already assigned to the security zone, identify a set of candidate objects (outside of the security zone) that have a control relationship with respect to the object assigned to the security zone. For example, a control relationship can be a group membership, container association, specific ACE, etc. The security zone generation component 112 can, for each candidate object, determine whether the candidate object is a valid object for inclusion in the security zone. For example, the security zone generation component 112 can apply a rule set, utilize a trained classifier, request and/or receive input from an external system (e.g., via a GUI), etc. For each candidate object that is determined to be a valid object for inclusion in the security zone, the security zone generation component 112 can add the valid object to the set of objects to obtain an updated set of objects. Candidate objects that are not included in the security zone (i.e., invalid objects) can be marked as a security violation (e.g., by the identity system management server 110 or the computing device 120). The process of identifying a set of candidate objects can then be repeated using the updated set of objects. The security zone is generated when there are no more candidate objects identified with a control relationship to the objects of the set of objects.

Illustratively, assume that the security zone to be generated is a Tier 0 security zone. The objects of the Tier 0 security zone can include administrative objects that have control over most, if not all, objects of the computing environment (e.g., global administrator or administrative server). For example, the set of objects of the Tier 0 security zone in Active Directory® can be initialized to include "Domain Admins" and "Domain Controllers". During the first object addition iteration, the security zone generation component 112 has detected control relationships including "Tier 0 Admins->Member Of->Domain Admins", "DC1->Member Of->Domain Controllers", and "DC2->Member Of->Domain Controllers". The candidate objects "Tier 0 Admins", "DC1" and "DC2" are determined to be valid objects that are added to the set of objects. During a second object addition iteration, the security zone generation component 112 has detected control relationships including "john_admin->Member Of->Tier 0 Admins", "jane_admin->Member Of->Tier 0 Admins" and "attacker->Write Owner->DC2". The candidate objects "john_admin" and "jane_admin" are determined to be valid objects that are added to the set of objects, while the object "attacker" is determined to be an invalid object that is not added to the set of objects. During a third object addition iteration, the security zone generation component 112 has detected the single control relationship "attacker->Write Owner->DC2". Since no additional valid objects have been identified during the third iteration to add to the set of objects, the process can conclude. In some implementations, the identity system management server 110 can generate an alert (e.g., to the computing device 120) indicating that there is an invalid control relationship "attacker->Write Owner->DC2".

In some implementations, the security zone generation component 112 can generate a security zone by performing a zero-cost attack path method. A zero-cost attack path is an attack path having an attack path cost equal to zero. To identify a security zone by performing the zero-cost attack path method, the security zone generation component 112 can, after obtaining the initial set of objects, determine a set of candidate zero-cost attack paths that lead into the security zone. More specifically, an object of the initial set of objects can be a target object of at least one candidate zero-cost attack path. The security zone generation component 112 can then, for each candidate zero-cost attack path, determine whether the source object of the attack path is valid. For example, the security zone generation component 112 can apply a rule set, utilize a trained classifier, request and/or receive input from an external system (e.g., the computing device 120 via a GUI), etc. The security zone generation component 112 can, for each valid source object, add all objects of the corresponding zero-cost attack path to the security zone. Source objects of zero-cost attack paths that are not valid can be marked as a security violation (e.g., by the identity system management server 110 or the computing device 120). Further details regarding generating security zones will be described below with reference to FIGS. 3-4.

A zero-cost attack path method described above can be applied to any object, regardless of object type (e.g., whether the object is a security principal). For example, a zero-cost attack method can identify an empty group that has a zero-cost path to a security zone as a candidate for inclusion into the security zone, so that the empty group can be monitored for the addition of a user that automatically provides the user with zero-cost control over the security zone.

The identity system management server 110 can further include an attack path monitoring and risk mitigation component ("component") 114 to perform attack path monitoring and risk mitigation.

The identity system management server 110 can receive input data from the at least one data source to perform attack path monitoring and computing environment risk mitigation. The input data can include data describing activity being performed within the computing environment. For example, the input data can include data reflecting object activity (e.g., user activity and/or computer activity), such as replication data, event logs, application programming interface (API_ activity data, etc. The identity system management server 110 can collect the input data using a suitable protocol for communicating with the directory service. In some implementations, the protocol is LDAP. Data monitoring can be performed using a replication service in conjunction with event logs. In some implementations, at least a portion of the input data is actively requested by the identity system management server 110 (e.g., pulled from the at least one data source 110). In some implementations, at least a portion of the input data is passively received by the identity system management server 110 (e.g., pushed by the at least one source 110).

From the input data, the component 114 can identity a set of attack paths leading to the at least one security zone, and determine which attack path(s) should be addressed to mitigate attack risk within the computing environment 100. For example, the attack risk can be a risk of a potential attack within the computing environment 100. Additionally or alternatively, the attack risk can include a risk of an actual attack occurring within the computing environment. For example, a risk of an actual attack occurring within the computing environment can be determined from the risk of a potential attack and a risk of anomalous activity determined from behavioral analytics.

In some implementations, the component 114 can perform static attack path monitoring and computing environment risk mitigation. Static attack path monitoring and computing environment risk mitigation involves identifying at least one attack path of the computing environment that contributes the most to the overall risk of the computing environment.

For example, the component 114 can obtain a set of attack path risk metrics, a set of security zone risk metrics from the set of attack path risk metrics, and a computing environment risk metric from the set of security zone risk metrics, as described in further detail above. The component 114 can determine, for each attack path, a risk impact of the attack path on the computing environment risk metric based on the attack path risk metric. For example, the component 114 can, for each attack path, model the removal of the attack path and recalculate the computing environment risk metric (i.e., a new aggregation of the security zone risk metrics for all security zones of the computing environment) to obtain a modified computing environment risk metric. The component 114 can then identify, from each risk impact, at least one attack path among the set of attack paths having a greatest risk impact on the computing environment. For example, the component 114 can, for each attack path, determine an amount of risk reduction by subtracting the modified computing environment risk metric from the original computing environment risk metric, and identify the at least one attack path that, when removed, has the greatest amount of risk reduction. The component 114 can address the at least one attack path having the greatest impact on the computing environment. For example, the component 114 can remove the at least one attack path, modifying the at least one attack path (e.g., alter at least one control relationship between at least one pair of objects within the attack path), etc. Further details regarding performing static attack path monitoring and risk mitigation are described below with reference to FIG. 5A.

In some implementations, the component 114 can perform dynamic attack path monitoring and computing environment risk mitigation (e.g., continuously or in real-time). For example, the component 114 can perform dynamic attack path monitoring and attack risk mitigation by detecting any changes (e.g., proposed changes) with respect to the set of attack paths. The changes can be detected by analyzing the input data (e.g., replication data and/or event logs). In some implementations, the change can be a change that triggers an update to at least one attack path risk metric of at least one attack path. For example, a change can be a change to a control relationship, a change to security principal exploitability, a change to a security zone definition, etc. In some implementations, the change can be a change that generates at least one new attack path.

The component 114 can then determine, for each change, a risk for implementing the change, and determine, for each change, whether the risk satisfies a risk threshold condition. In some implementations, determining whether the risk of a change satisfies a risk threshold condition includes determining whether the change causes an object of a security zone to enter into a higher risk category (e.g., from high risk to critical risk). In some implementations, determining whether the risk of a change satisfies a risk threshold condition includes determining whether the change results in a significant or unacceptable increase in risk.

If the component 114 determines that risk satisfies the risk threshold condition, then the component 114 can address the at least one change (otherwise the identity system management server can implement the at least one change). For example, to address a change, the identity system management server can generate an alert. The alert may be in the form of a notification on the dashboard of an administrator's account, an email to an administrator, a text message, a notification on a smartphone, etc. Additionally or alternatively, to address a change, the component 114 can model the change before applying the change, and determine whether to prevent the change from being applied. For example, if the component 114 determines that a change results in a significant or unacceptable increase in risk, then the component 114 can block or roll back the change to prevent the change from being implemented. Additionally or alternatively, to address a change, the component 114 can deny access to an object (e.g., user access to a resource) if access to the object would result in an unacceptable increase in risk. Further details regarding performing dynamic attack path monitoring and risk mitigation are described below with reference to FIG. 5B.

In some implementations, the component 114 can perform real-time attack path monitoring and risk mitigation with behavioral analytics. For example, in response to detecting anomalous behavior originating from an attack path, the component 114 can determine a risk associated with the attack path. For example, the risk can be determined from the attack path risk metric for the attack path. The component 114 can then determine whether the risk satisfies a threshold condition. In some implementations, the component 114 can determine whether the risk is greater than a threshold amount of risk of the anomalous behavior. For example, the component 114 can determine whether the criticality of the target object exceeds a threshold criticality. If the component 114 determines that the at least one attack path risk metric satisfies the threshold condition, this means that the anomalous behavior is sufficiently high risk, and the component 114 can address the anomalous behavior. Otherwise, if the component 114 determines that the at least one attack path risk metric does not satisfy the threshold condition, this means that the anomalous behavior is not sufficiently high risk, and the component 114 can ignore the anomalous behavior. Additionally or alternatively, the level of risk of a scenario can dictate the urgency of the response. For example, a real-time alert can be generated for a high-risk scenario, and a log entry can be generated for a low-risk scenario).

There may be risk amplification along an attack path. For example, the attack path risk metric for an attack path can be a function of the number of objects of which anomalous behavior has been detected ("anomalous objects"). For example, an attack path including two anomalous objects can have a greater amount of risk than an attack path including a single anomalous object, but a smaller amount of risk than an attack path including more than two anomalous objects. There may not be a linear relationship between the number of anomalous objects and the amount of risk. For example, there may be an exponential relationship between the number anomalous objects and the amount of risk.

The identity system management server 110 can further analyze the intensity (e.g., timing) of changes per attack path, which can amplify the corresponding attack path risk metric. For example, many changes performed in a short period of time can indicate a high risk, even if the changes themselves are not individually risky. Further details regarding performing real-time attack path monitoring and computing environment risk mitigation with behavioral analytics will be described below with reference to FIG. 5C.

In some implementations, the identity system management server 110 utilizes an identity risk fabric to reduce false positives in attack path monitoring and attack detection. The identity risk fabric can correspond to a static risk plane reflecting a current risk landscape. A static risk plane can be defined by a combination of security zones with attack paths reflecting a current configuration. Every object (e.g., security principal) in a static risk plane can have a respective risk score determined by the attack paths that traverse the object. Activity data, such as directory changes or login events, can be overlaid on the identity risk fabric to generate a dynamic risk score which can be used to detect risk activities in near real time. The identity risk fabric can modulate legitimate changes in the environment and notoriously noisy behavioral indicators to reduce noise and prioritize (e.g., amplify) changes and anomalies affecting high risk or critical objects, reducing false positives in detecting potential attacks.

In some implementations, the identity system management server 110 performs attack risk monitoring and risk mitigation with respect to hybrid identity systems in which at least a first identity system is linked to at least a second identity system. For example, identity system management server 110 can be used to trace attack paths across a hybrid identity system. In some instances, a link between the first identity system and the second identity system is explicit (e.g., an on-premises system directory system account linked to a remote system directory system account). In some instances, a link between the first identity system and the second identity system is not explicit. For example, a user can have a directory system account linked to an account that utilizes an authentication process to enable SSO, such as SAML authentication. In some instances, a link between the first identity system and the second identity system is completely distinct. In such situations, identities can be correlated using some other scheme.

In some implementations, the identity system management server 110 utilizes an in-memory distributed large graph processing engine. An identity-centric graph schema can be designed to facilitate federated processing of individual identity systems with centralized analysis of inter-identity-system relationships for hybrid identity system protection.

In some implementations, the identity system management server 110 utilizes a top-down approach that first identifies high-level targets, and then traverses control relationships to identify security principals that can exploit these relationships to gain control of the environment. Such a top-down approach can be more computationally efficient that other approaches by reducing the number of vertices or nodes being analyzed. Such a top-down approach is also defense-minded by identifying a security perimeter that is monitored and protected.

In some implementations, the identity system management server 110 utilizes cost models for control relationships that are scored on multiple factors such as complexity (e.g., the level of skills and effort needed for exploitation), artifacts (e.g., traces of exploitation left in data items such as audit logs or configuration changes), extra steps (e.g., additional exploitation steps that are needed), etc. The risk of a specific attack path can be inversely proportional to the total cost of the relationships in the path. For example, group membership has zero cost as it doesn't require any effort to exploit and doesn't leave any traces, so the risk is high.

In some implementations, the identity system management server 110 utilizes a default cost profile. The default cost profile can assume an attack by an attacker with average attacking skills and average detectability. In some implementations, the identity system management server uses a custom cost profile that customizes attacking skills of an attacker and/or detectability. For example, a custom cost profile can be tuned to focus on attackers with a high level of sophistication who are attempting to perform a discreet attack, attackers who are attempting to perform an attack without discretion (e.g., publicity attacks), etc.

The identity system management server 110 can utilize multiple security zones. For example, the most critical components of computing environment 100 can include components that control security and identity infrastructure (e.g., Tier 0 assets). Various approaches can be used to define such critical components of a computing system, such as zero-cost attack path analysis, as well as to detect and risk-score security principals that have control relationships over such critical components. In some implementations, the identity system management server 110 supports user-defined security zones (e.g., additional security zones) that are each defined with a respective criticality level.

In some implementations, the identity system management server 110 utilizes an efficient data collection format. For example, the identity system management server 110 can utilize a compact data serialization format for storing data as compared to, e.g., XML (eXtensible Markup Language or JSON (JavaScript Object Notation). In some implementations, the compact data serialization format is a Protobuf data serialization format.

Figure 2:
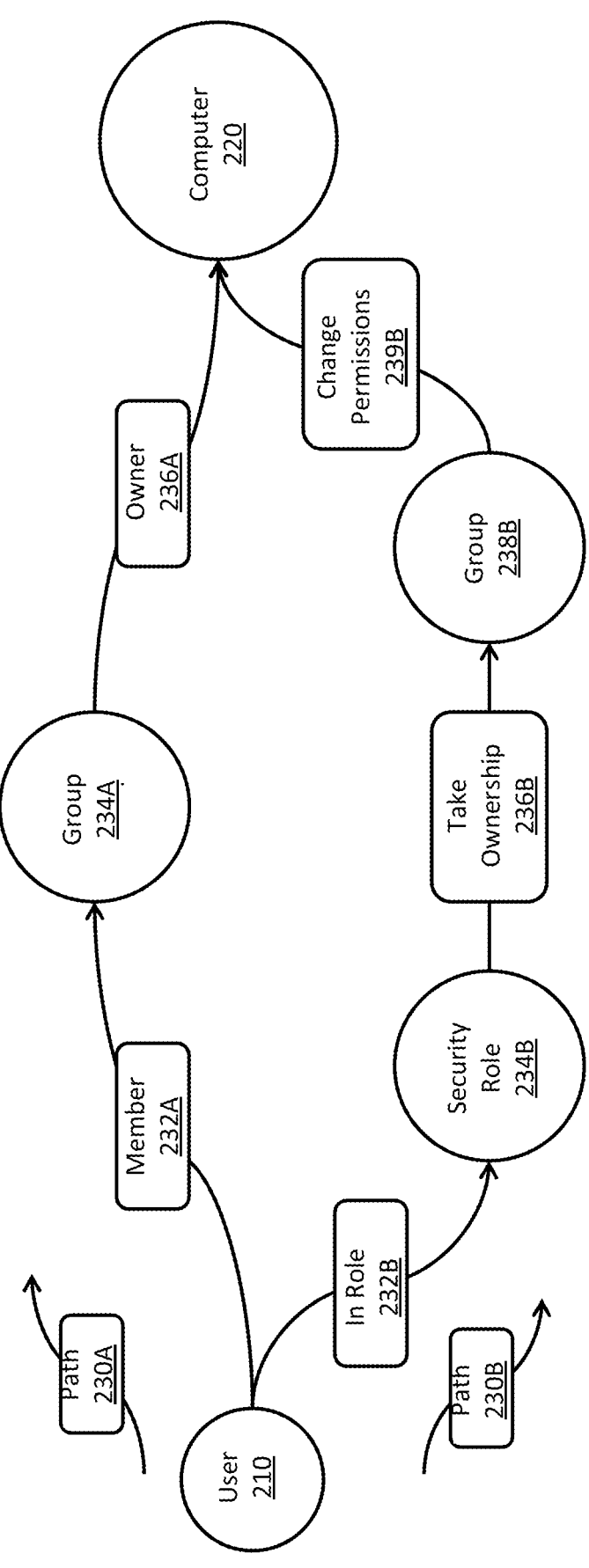
FIG. 2 is a diagram of example representation of attack paths, according to some implementations.

FIG. 2 is a diagram 200 of an example representation of attack paths, according to some implementations. In this illustrative example, the diagram 200 is an identity graph representing relationships between objects of a computing environment implementing a directory service. As shown, the diagram 200 includes a source vertex 210 corresponding to a user and a target vertex 220 corresponding to a computer. As further shown, a number of attack paths exist between the source vertex 210 and the target vertex 220, including path 230A and path 230B.

Path 230A includes an edge 232A connecting the source vertex 210 to an intermediate vertex 234A representing a group, and an edge 236A connecting the intermediate vertex 234A to the target vertex 220. More specifically, the edge 232A represents the control relationship "Member Of", which indicates that the user is a member of the group represented by vertex 234A. The edge 236A represents the control relationship "Owner", which indicates that the group owns the computer.

Path 230B includes an edge 232B connecting the source vertex 210 to an intermediate vertex 234B representing a security role, an edge 236B connecting the intermediate vertex 234B to an intermediate vertex 238B representing a group, and an edge 239B connecting the intermediate vertex 238B to the target vertex 220. More specifically, the edge 232B represents the control relationship "In Role", which indicates that the user is assigned a security role. The edge 236B represents the control relationship "Take Ownership", which indicates that the user in the security role can take ownership of the group. The edge 239B represents the control relationship "Change Permissions", which indicates that the group represented by vertex 238B can change permissions with respect to the computer.

As mentioned above, each control relationship can have a cost for edge traversal. The cost can be directly related to a variety of factors, such as difficulty (e.g., east of exploitation and number of extra steps) and/or observability of edge traversal. For example, observability can be determined by the number of changes and/or artifacts (e.g., event logs) that are generated for edge traversal. For example, a zero-cost edge traversal can be one in which no change is required, and no artifacts are generated (e.g., group membership), while a higher cost edge traversal can include one or more highly visible changes and/or artifacts.

For example, the "Member Of" relationship can have a total cost of 0 (i.e., 0 cost for each of the factors), the "In Role" relationship can have a total cost of 0, the "Owner" relationship can have a total cost of 0 (i.e., 0 cost for each of the factors), the "Change Permissions" relationship can have a total cost of 1 (e.g., a cost of 1 for number of changes/artifacts), and the "Take Ownership" relationship can have a total cost of 2 (e.g., a cost of 1 for the number of changes/artifacts and a cost of 1 for extra steps). These cost values are purely exemplary, and any suitable cost metric can be used in accordance with implementations described herein. In this example, Path A has a cost of 0 (i.e., the "Member Of" and "Owner" relationships each have zero-cost) and Path B has a cost of 3 (i.e., the "Take Ownership" relationship has a cost of 2 and the "Change Permissions" relationship has a cost of 1), then Path A can be identified as the least-cost attack path since it has the lowest collective cost.

Figure 3:
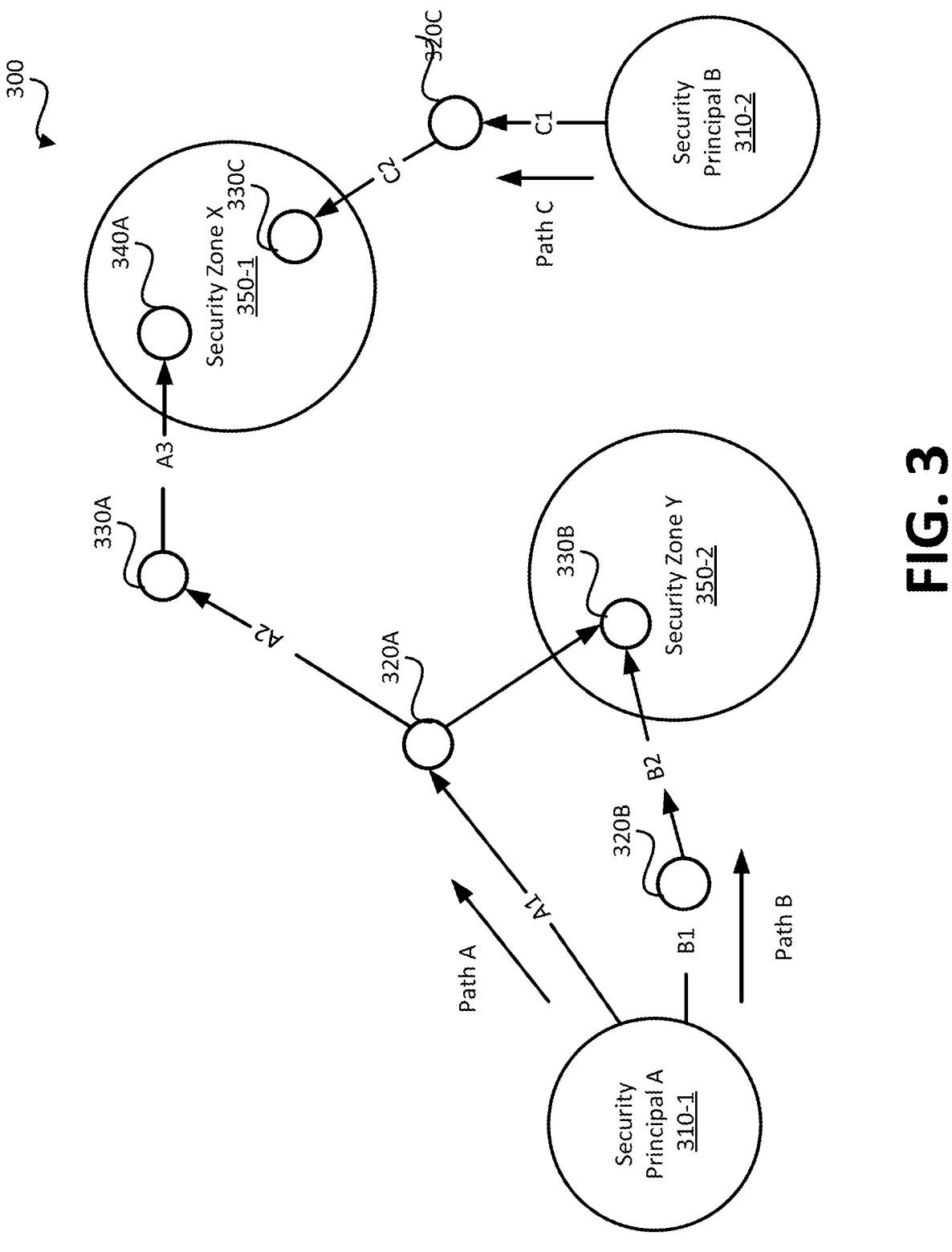
FIG. 3 is a diagram of an example representation of attack paths, according to some implementations.

FIG. 3 is a diagram 300 of an example representation of attack paths, according to some implementations. In this illustrative example, the diagram 300 is an identity graph representing relationships between objects of a computing environment implementing a directory service. As shown, the diagram 300 includes a source vertex 310-1 corresponding to a security principal ("Security Principal A") and a source vertex 310-2 corresponding to another security principal ("Security Principal B").

As further shown, two attack paths start from the source vertex 310-1 ("Path A" and "Path B"), and a single attack path starts from the source vertex 310-2 ("Path C"). Path A includes an edge "A1" representing a control relationship between the source vertex 310-1 and intermediate vertex 320A representing an object, an edge "A2" representing a control relationship between the intermediate vertex 320A and an intermediate vertex 330A representing an object, and an edge "A3" representing a control relationship between the intermediate vertex 330A and a target vertex 340A representing a target object. Path B includes an edge "B1" representing a control relationship between the source vertex 310-1 and intermediate vertex 320B representing an object, and an edge "B2" representing a control relationship between the intermediate vertex 320B and a target vertex 330B representing a target object. Path C includes an edge "C1" representing a control relationship between the source vertex 310-2 and intermediate vertex 320C representing an object, and an edge "C2" representing a control relationship between the intermediate vertex 320C and a target vertex 330C representing a target object.

Path A through Path C can each be assigned a respective attack path risk metric. As described above, an attack path risk metric for an attack path represents a risk of an attacker choosing the attack path, and an attack path risk metric can have a number of components. For example, the component of the attack path risk metric can be determined based on the cost of the attack path (where lower cost means higher risk), an initial exploitability of the source object of the attack path (e.g., the security principal), and the criticality of the target object of the attack path (e.g., the criticality of the security zone of which the target object is a member). For example, the cost of Path A can be determined from the cumulative cost of the control relationships represented by the edges A1 through A3. The cost of Path B can be determined from the cumulative cost of the control relationships represented by the edges B1 and B2. The cost of Path C can be determined from the cumulative cost of the control relationships represented by the edges C1 and C2.

As further shown, the diagram 300 includes a number of security zones, including Security Zone X 350-1 and Security Zone Y 350-2. More specifically, Security Zone X 350-1 includes the objects represented by the target vertices 340A and 330C, and Security Zone Y 350-2 includes the object represented by the target vertex 330.

A security zone risk metric can be determined for each of the security zones. A security zone risk metric for a security zone represents an aggregation of risks of all attack paths leading into the security zone. For example, the security zone risk metric for Security Zone X 350-1 can be determined at least in part from the attack path risk metrics for Paths A and C (e.g., the sum of the attack path risk metrics for Paths A and C), and the security zone risk metric for Security Zone Y 350-2 can be determined at least in part from the attack path risk metric for Path B.

A computing environment risk metric can be determined for the computing environment. A computing environment risk metric for a computing environment represents an aggregation of the security zone risk scores for all security zones of the computing environment. For example, the computing environment risk metric can be determined at least in part from the security zone risk metric for Security Zone X 350-1 and the security zone risk metric for Security Zone Y 350-2 (e.g., the sum of the security zone risk metric for Security Zone X 350-1 and the security zone risk metric for Security Zone Y 350-2).

Attack path monitoring and computing environment risk mitigation can be implemented using the risk metrics described above (e.g., static attack path monitoring and risk mitigation, dynamic attack path monitoring and risk mitigation and/or real-time risk mitigation with behavioral analytics). Further details regarding implementing attack path monitoring and risk mitigation are described above and will now be described in further detail below with reference to FIGS. 4-5C.

Figure 4:
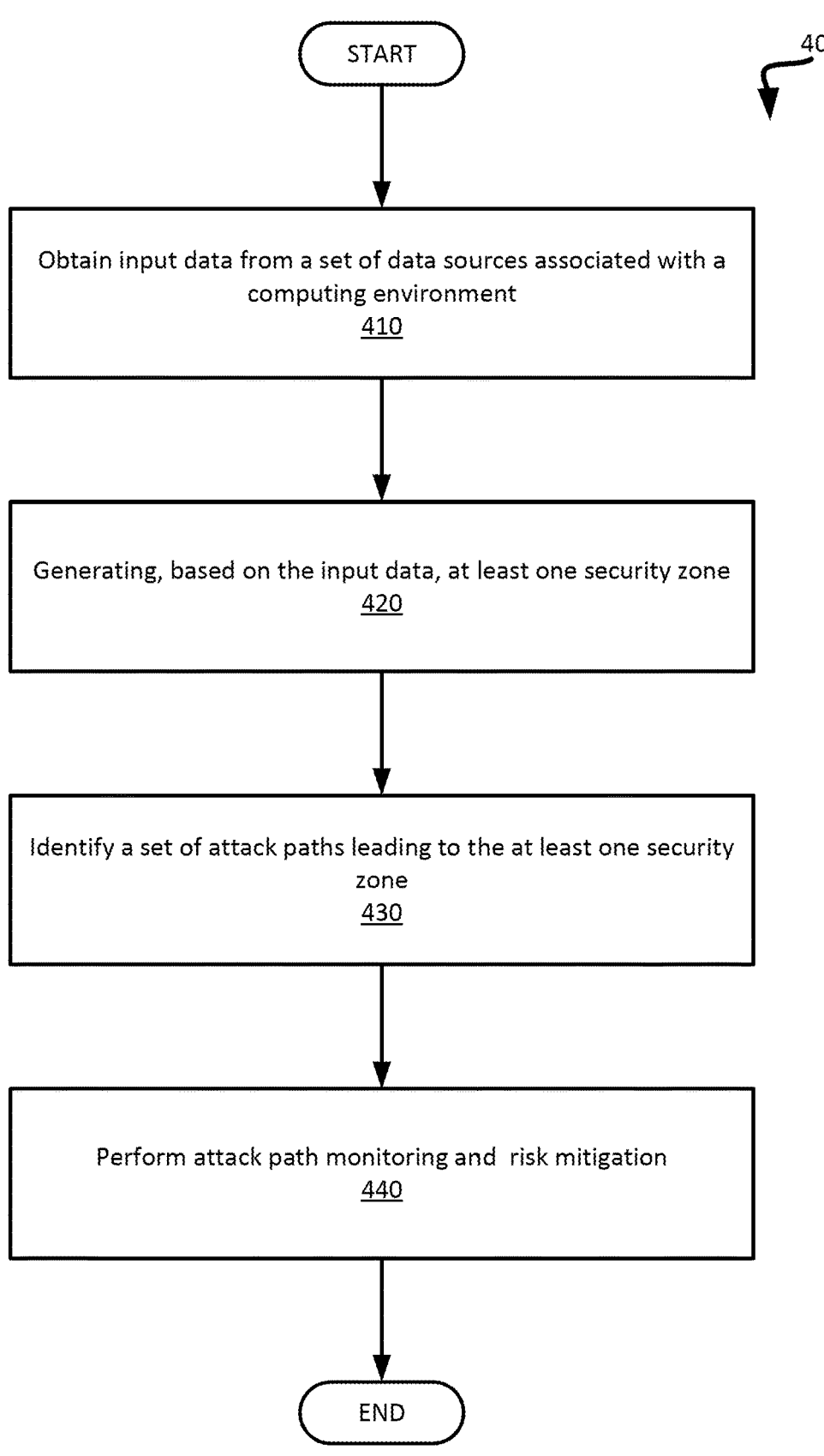
FIG. 4 is a flow diagram illustrating an example method for implementing attack path monitoring and risk mitigation in identity systems, according to some implementations.

FIG. 4 depicts a flow diagram of example method 400 for implementing attack path monitoring and risk mitigation in identity systems, according to some implementations. Method 400 may be performed by one or more processing devices that may comprise hardware (e.g., circuitry, dedicated logic), software (such as is run on a general-purpose computer system or a dedicated machine), or a combination of both. Method 400 and each of its individual functions, routines, subroutines, or operations may be performed by one or more processors of the processing device executing the method. For example, the method 400 may be performed by the identity system management server 110 of FIG. 1. In certain implementations, method 400 may be performed by a single processing device. Alternatively, method 400 may be performed by two or more processing devices, each processing device executing one or more individual functions, routines, subroutines, or operations of the method.

At operation 410, processing logic obtains input data from a set of data sources associated with a computing environment. The computing environment can include a plurality of objects. For example, the plurality of objects can include a set of security principals and a set of computing resources. The set of security principals can include at least one of: one or more user accounts or one or more computer accounts. The plurality of objects can further include one or more groups of accounts (e.g., one or more groups of user accounts and/or one or more groups of computer accounts). The computing environment can use at least one identity system. Multiple identity systems can be used in a hybrid identity solution, for example, when a user authenticates against one identity system to access resources in another identity system.

In some implementations, the objects of the computing environment are represented by least one identity graph. More specifically, each object of an attack path can be represented by a respective vertex, and each relationship (e.g., control relationship) between objects can be represented by a respective edge. For example, a source object of an attack path (e.g., security principal) can be represented by a source vertex and a target object of an attack path (e.g., computing resource) can be represented by a target vertex. Thus, the source vertex and the target vertex can be separated by one or more edges. Further details regarding identity graphs are described above with reference to FIGS. 1-3.

At operation 420, processing logic generates, based on the input data, at least one security zone. Each security zone can be assigned a set of characteristics, and can include a respective set of objects, of the plurality of objects, that share the set of characteristics. For example, the set of objects can include one or more target objects of one or more attack paths. The set of characteristics can include a criticality (e.g., importance) in the computing environment. Objects of the security zone can inherit the criticality assigned to the security zone. The criticality of individual objects within the security zone can be modified (e.g., increased), if needed. Other characteristics of the set of characteristics can include related functionality, physical location, etc. For example, the at least one security zone can include a Tier 0 security zone.

Generating a security zone can include obtaining an initial set of objects of the security zone. For example, the initial set of objects can be a default list of objects defined within the computing environment. As another example, the initial set of objects can be received from an external system (e.g., via a GUI). Illustratively, the initial set of objects can include at least one of a group of administrators, a group of application servers, etc. After identifying the initial set of objects, a variety of different methods can be used to finish generating the security zone.

In some implementations, generating a security zone can include performing one or more object addition iterations after obtaining the initial set of objects. Performing an object addition iteration can include, for each object of the set of objects, identifying a set of candidate objects (outside of the set of objects) that have a control relationship with respect to the object. For example, a control relationship can be a group membership, container association, specific ACE, etc. Performing an object addition iteration can further include, for each candidate object, determining whether the candidate object is a valid object for inclusion in the security zone (e.g., by applying a rule set, utilizing a trained classifier, or requesting input from an external system (e.g., via a GUI)). Performing an object addition iteration can include adding each valid object to the set of objects to obtain an updated set of objects. Candidate objects that are not included in the security zone (i.e., invalid objects) can be identified as a security violation. The next object addition iteration can then be performed using the updated set of objects. The security zone is generated when there are no more valid objects identified with a control relationship to the objects of the set of objects. Further details regarding performing one or more object addition iterations are described above with reference to FIG. 1.

In some implementations, generating the at least one security zone can include performing a zero-cost attack path method after obtaining the initial set of objects. Performing the zero-cost attack path method can include determining a set of candidate zero-cost attack paths that lead into the security zone. More specifically, an object of the initial set of objects can be a target object of at least one candidate zero-cost attack path. Performing the zero-cost attack path method can further include, for each candidate zero-cost attack path, determining whether the source object of the attack path is valid (e.g., applying a rule set, utilizing a trained classifier, or requesting input from an external system (e.g., via a GUI)). Performing the zero-cost attack path method can further include, for each valid source object, adding all objects of the corresponding zero-cost attack path to the security zone. Source objects of zero-cost attack paths that are not valid can be marked as a security violation. Additionally, any non-zero-cost attack paths that include an object of the security zone can be addressed. Further details regarding performing the zero-cost attack path method are described above with reference to FIG. 1.

At operation 430, processing logic identifies a set of attack paths leading into the at least one security zone. More specifically, each object of a security zone can be a target object of at least one attack path, where each attack path connects the target object to a respective source object via one or more control relationships. For example, for each attack path, the target object can be represented by a target vertex of an identity graph, the source object can be represented by a source vertex of the identity graph, and the one or more control relationships can be represented by one or more respective edges between pairs of vertices of the identity graph.

After identifying the set of attack paths, processing logic can perform attack path monitoring and risk mitigation. Attack path monitoring and risk mitigation can be performed to determine which attack path(s) of the set of attack paths should be addressed to reduce attack risk within the computing environment. For example, attack path monitoring and risk mitigation can be performed by utilizing a set of risk metrics derived from the set of attack paths. Examples of risk metrics include an attack path risk metric, an object risk metric, a security zone risk metric, and a computing environment risk metric. Further details regarding the set of risk metrics are described above with reference to FIG. 1.

In some implementations, performing attack path monitoring and risk mitigation includes performing static attack path monitoring and risk mitigation. For example, static attack path monitoring and risk mitigation can be performed to reduce the risk of potential attack with respect to at least one attack path of the set of attack paths. Further details regarding performing static attack path monitoring and computing environment risk mitigation are described above with reference to FIG. 1 and will be described in further detail below with reference to FIG. 5A.

In some implementations, performing attack path monitoring and computing environment risk mitigation includes performing dynamic attack path monitoring and risk mitigation. For example, dynamic attack path monitoring and risk mitigation can be performed to reduce the risk of potential attack with respect to at least one attack path of the set of attack paths. Further details regarding performing dynamic attack path monitoring and computing environment risk mitigation are described above with reference to FIG. 1 and will be described in further detail below with reference to FIG. 5B.

In some implementations, performing attack path monitoring and computing environment risk mitigation includes performing real-time attack path monitoring and risk mitigation with behavior analytics. For example, real-time attack path monitoring and risk mitigation can be performed to mitigate an actual attack occurring with respect to at least attack path Further details regarding performing real-time attack path monitoring and computing environment risk mitigation with behavior analytics are described above with reference to FIG. 1 and will be described in further detail below with reference to FIG. 5C.

In some implementations, performing attack path monitoring and computing environment risk mitigation comprises using an identity risk fabric to at least one of: amplify risk for at least a first object or reduce risk of at least a second object. For example, the first object can be a high risk object (e.g., critical object) and the second object can be a low risk object. The identity risk fabric can modulate the risk of dynamic changes and/or behavioral anomalies to amplify the risk for the first object and/or reduce the risk of the second object.

Figure 5A:
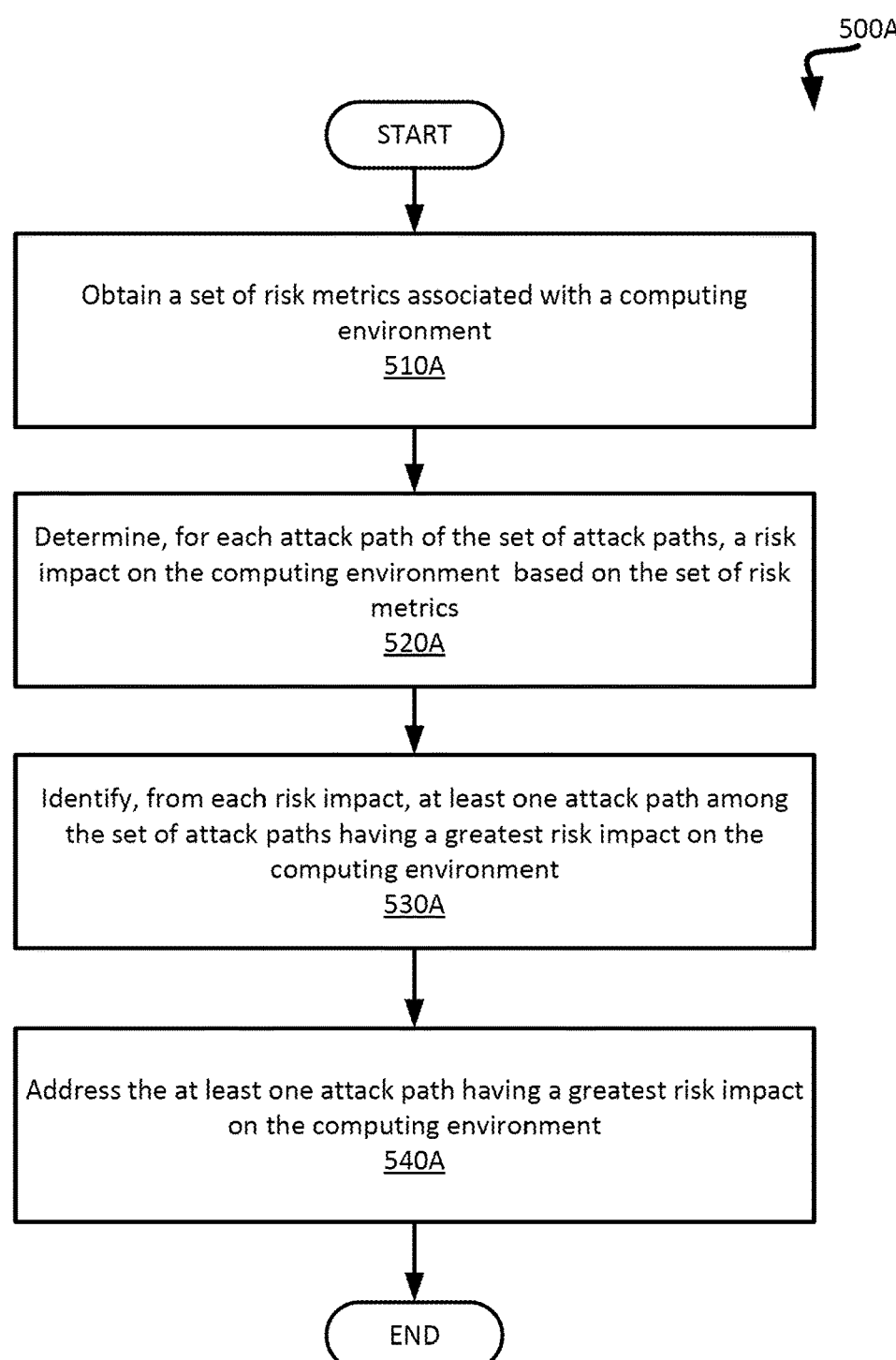
FIG. 5A is flow diagrams illustrating an example method for performing static attack path monitoring and risk mitigation in identity systems, according to some implementations.

FIG. 5A depicts a flow diagram of example method 500A for performing static attack path monitoring and computing environment risk mitigation, according to some implementations, in accordance with an aspect of the invention. Method 500A may be performed by one or more processing devices that may comprise hardware (e.g., circuitry, dedicated logic), software (such as is run on a general-purpose computer system or a dedicated machine), or a combination of both. Method 500A and each of its individual functions, routines, subroutines, or operations may be performed by one or more processors of the processing device executing the method. For example, the method 500A may be performed by the identity system management server 110 of FIG. 1. In certain implementations, method 500A may be performed by a single processing device. Alternatively, method 500A may be performed by two or more processing devices, each processing device executing one or more individual functions, routines, subroutines, or operations of the method.

At operation 510A, processing logic can obtain a set of risk metrics associated with a computing environment. The set of risk metrics can include a set of attack path risk metrics. Each attack path risk metric of the set of attack path risk metrics can correspond to a respective attack path of a set of attack paths of the computing environment. The set of risk metrics can further include a set of object risk metrics. Each object risk metric of the set of object risk metrics can correspond to a respective object of the computing environment. Further details regarding obtaining the set of attack path risk metrics and the set of object risk metrics are described above with reference to FIGS. 1-4.

The set of risk metrics can further include a set of security zone risk metrics. Each security zone risk metric of the set of security zone risk metrics can correspond to a respective security zone of the computing environment. For example, each security zone risk metric of the set of security zone risk metrics can be obtained as an aggregation of attack path risk metrics of attack paths leading into the security zone. Further details regarding obtaining the set of security zone risk metrics are described above with reference to FIGS. 1-4.

The set of risk metrics can further include a computing environment risk metric corresponding to the computing environment. The computing environment risk metric can be determined as an aggregation of the security zone risk metrics of the set of security zone risk metrics. Further details regarding obtaining the computing environment risk metric are described above with reference to FIGS. 1-4.

At operation 520A, processing logic can determine, for each attack path of the set of attack paths, a risk impact on the computing environment based on the set of risk metrics. For example, determining the risk impact of an attack path can include modeling, for each attack path, the removal of the attack path and recalculating the computing environment risk metric (i.e., a new aggregation of the security zone risk scores for all security zones of the computing environment) to obtain a modified computing environment risk metric. Determining the risk impact of the attack path can further include determining an amount of risk reduction by subtracting the modified computing environment risk metric from the original computing environment risk metric.

At operation 530A, processing logic can identify, from each risk impact, at least one attack path among the set of attack paths having a greatest risk impact on the computing environment risk metric. For example, identifying the at least one attack path can include identifying the at least one attack path that, when removed, has the greatest amount of risk reduction.

At operation 540A, processing logic can address the at least one attack path having a greatest impact on the computing environment. In some implementations, addressing the at least one attack path can include removing the at least one attack path. In some implementations, addressing the at least one attack path can include modifying the at least one attack path (e.g., altering at least one control relationship between at least one pair of objects within the attack path). Further details regarding operations 510A-540A are described above with reference to FIGS. 1-4.

Figure 5B:
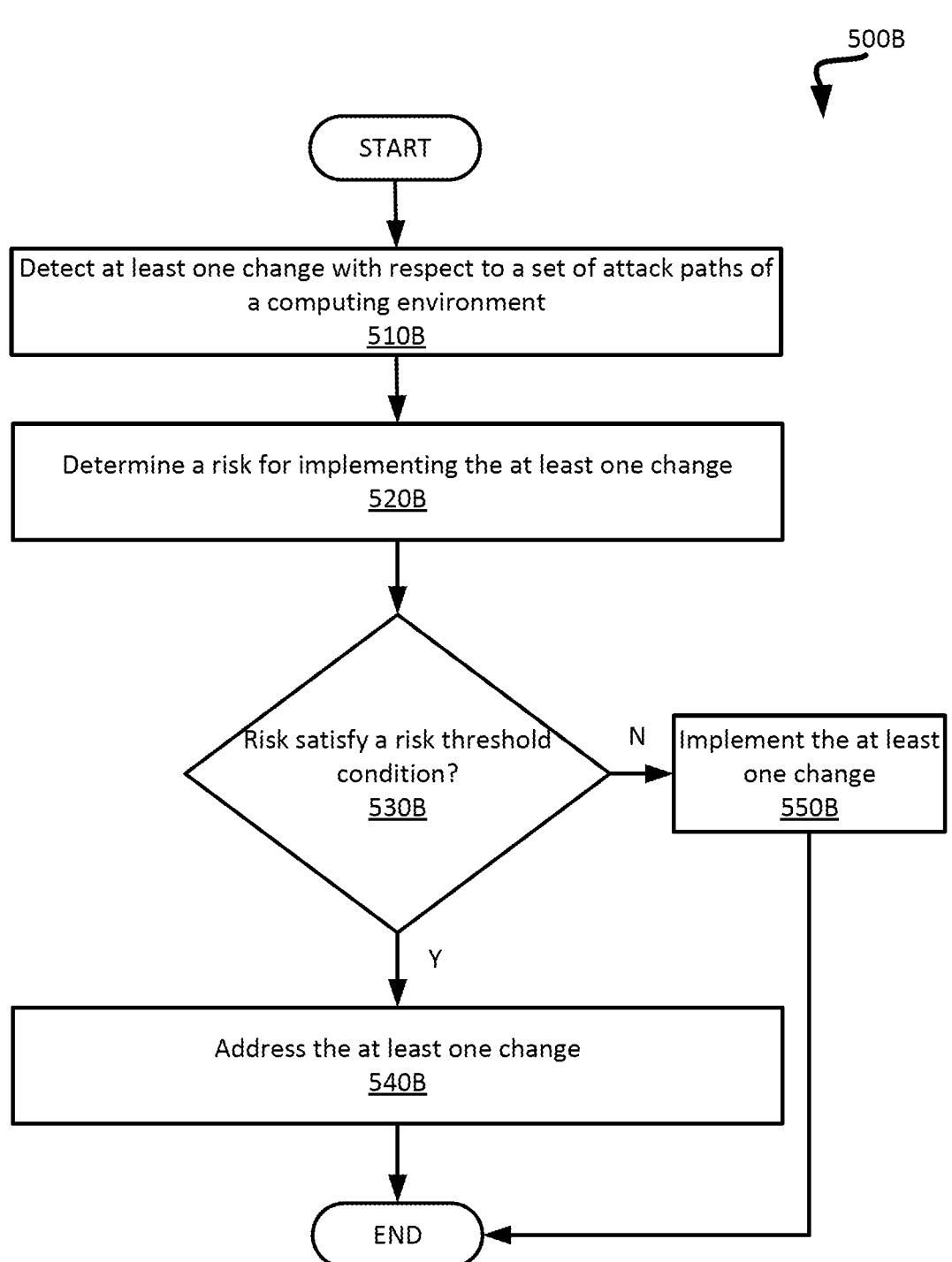
FIG. 5B is flow diagrams illustrating an example method for performing dynamic attack path monitoring and risk mitigation in identity systems, according to some implementations.

FIG. 5B depicts a flow diagram of example method 500B for performing dynamic attack path monitoring and computing environment risk mitigation, according to some implementations, in accordance with an aspect of the invention. Method 500B may be performed by one or more processing devices that may comprise hardware (e.g., circuitry, dedicated logic), software (such as is run on a general-purpose computer system or a dedicated machine), or a combination of both. Method 500B and each of its individual functions, routines, subroutines, or operations may be performed by one or more processors of the processing device executing the method. For example, the method 500B may be performed by the identity system management server 110 of FIG. 1. In certain implementations, method 500B may be performed by a single processing device. Alternatively, method 500B may be performed by two or more processing devices, each processing device executing one or more individual functions, routines, subroutines, or operations of the method.

At operation 510B, processing logic can detect at least one change with respect to a set of attack paths of a computing environment. For example, a change can be a proposed change that has not been applied to the computing environment. A change can be detected by analyzing the input data (e.g., replication data and/or event logs). In some implementations, a change can be a change that triggers an update to at least one attack path risk metric of at least one attack path. For example, a change can be a change to a control relationship, a change to security principal exploitability, a change to a security zone definition, etc. In some implementations, the change can be a change that generates at least one new attack path.

At operation 520B, processing logic can determine, for each change, a risk for implementing the change and, at operation 530B, processing logic can determine whether the risk for implementing the at least one change satisfies a risk threshold condition. In some implementations, determining whether the risk of a change satisfies a risk threshold condition includes determining whether the change causes an object of a security zone to enter into a higher risk category (e.g., from high risk to critical risk). In some implementations, determining whether the risk of a change satisfies a risk threshold condition includes determining whether the change results in a significant or unacceptable increase in risk (e.g., whether the risk is greater than or equal to the threshold amount of risk for implementing the at least one change).

If the risk of at least one change satisfies the risk threshold condition, this means that the at least one change can introduce an increased risk of attack. Thus, at operation 540B, processing logic can address the at least one change. If the risk does not satisfy the threshold condition, this means that the change is suitable for implementation. Thus, processing logic can implement the at least one change at operation 550B.

For example, addressing a change can include generating an alert. The alert may be in the form of a notification on the dashboard of an administrator's account, an email to an administrator, a text message, a notification on a smartphone, etc. Additionally or alternatively, addressing a change can include modeling the change before applying the change, and determining whether to prevent the change from being applied. For example, a change determined to result in a significant or unacceptable increase in risk can be blocked or rolled back to prevent the change from being applied. Additionally or alternatively, addressing the at least one change can include denying access to an object (e.g., user access to a resource) if access to the object would result in an unacceptable increase in risk. Further details regarding operations 510B-550B are described above with reference to FIGS. 1-4.

Figure 5C:
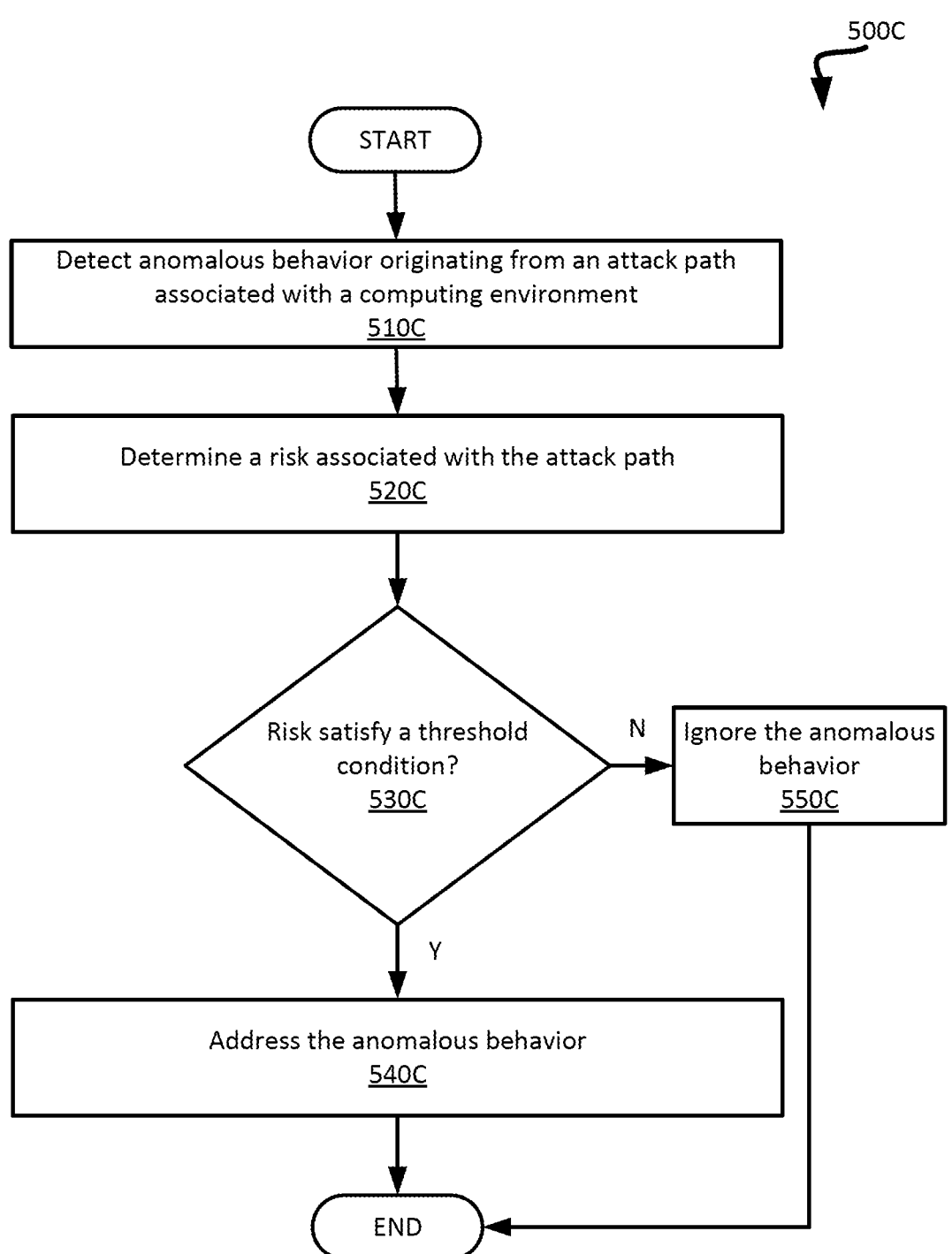
FIG. 5C is flow diagrams illustrating an example method for performing real-time attack monitoring and risk mitigation in identity systems with behavioral analytics, according to some implementations.

FIG. 5C depicts a flow diagram of example method 500C for performing real-time attack monitoring and computing environment risk mitigation with behavioral analytics, in accordance with an aspect of the invention. Method 500C may be performed by one or more processing devices that may comprise hardware (e.g., circuitry, dedicated logic), software (such as is run on a general-purpose computer system or a dedicated machine), or a combination of both. Method 500C and each of its individual functions, routines, subroutines, or operations may be performed by one or more processors of the processing device executing the method. For example, the method 500C may be performed by the identity system management server 110 of FIG. 1. In certain implementations, method 500C may be performed by a single processing device. Alternatively, method 500C may be performed by two or more processing devices, each processing device executing one or more individual functions, routines, subroutines, or operations of the method.

At operation 510C, processing logic can detect anomalous behavior originating from an attack path associated with a computing environment. For example, the anomalous behavior can be detected with respect to interaction with an object of the computing environment. Detecting anomalous behavior associated with the attack path can include analyzing activity data (e.g., log on data or access events).

At operation 520C, processing logic can determine a risk associated with the attack path and, at operation 530C, processing logic can determine whether the risk satisfies a threshold condition. The risk associated with the attack path can be determined from the attack path risk metric for the attack path. In some implementations, determining whether the risk satisfies the threshold condition can include determining whether the risk is greater than a threshold amount of risk of the anomalous behavior. For example, determining whether the risk satisfies the threshold condition can include determining whether the criticality of the target object of the attack path exceeds a threshold criticality.

If the risk satisfies the threshold condition (e.g., the risk is greater than or equal to the threshold amount of risk of the anomalous behavior), this means that the anomalous behavior is sufficiently risky. Thus, at operation 540C, processing logic can address the anomalous behavior. For example, addressing the anomalous behavior can include generating an alert of the anomalous behavior, and sending the alert to a computing device notifying at least one user (e.g., administrator) of the anomalous behavior. Addressing the anomalous behavior can further include receiving an action from the at least one user to address the anomalous behavior, which can cause processing logic to perform the action to address the anomalous behavior. As another example, processing logic can automatically perform an action to address the anomalous behavior (e.g., remove or modify the attack path).

If the risk does not satisfy the threshold condition (e.g., the risk is less than the threshold amount of risk of the anomalous behavior), this means that the anomalous behavior is not sufficiently risky. Thus, processing logic can ignore the anomalous behavior at operation 550C (i.e., not take any action to address the attack path). Additionally or alternatively, the level of risk of a scenario can dictate the urgency of the response. For example, a real-time alert can be generated for a high-risk scenario, and a log entry can be generated for a low-risk scenario. Accordingly, method 500C can reduce the number of anomalous behavior alerts that are generated, which can improve computer security efficiency and improve the ability to respond to more high risk or critical event alerts.

There may be risk amplification along an attack path. For example, the attack path risk metric for an attack path can be a function of the number of objects of which anomalous behavior has been detected ("anomalous objects"). For example, an attack path including two anomalous objects can have a greater amount of risk than an attack path including a single anomalous object, but a smaller amount of risk than an attack path including more than two anomalous objects. There may not be a linear relationship between the number of anomalous objects and the amount of risk. For example, there may be an exponential relationship between the number anomalous objects and the amount of risk.

The intensity (e.g., timing) of changes affecting the attack path can be analyzed, which can amplify the corresponding attack path risk metric. For example, many changes performed in a short period of time can indicate a high risk, even if the changes themselves are not individually risky. Further details regarding operations 510C-550C are described above with reference to FIGS. 1-4.

Attack path monitoring techniques described above can also be applied in reverse, to identify security zones that control large parts of the computing environment. For example, Tier 0 assets and associated attack paths can account for less than 0.1% of objects in a computing environment. Attack path monitoring described herein is very efficient since it allows analysts to focus on a small, but highly critical part of the computing environment. There might exist other groups of objects that, while not controlling the whole computing environment, nevertheless have control over significant fractions of it. Examples are regional and line-of-business administrative functions. While Tier 0 identification starts with a list of well-known objects and the analysis proceeds top-down to detect attack paths leading to Tier 0, we can also employ bottom-up approach to identify groups of objects that control large parts of the environment, and create additional security zones around them.

Figure 6:
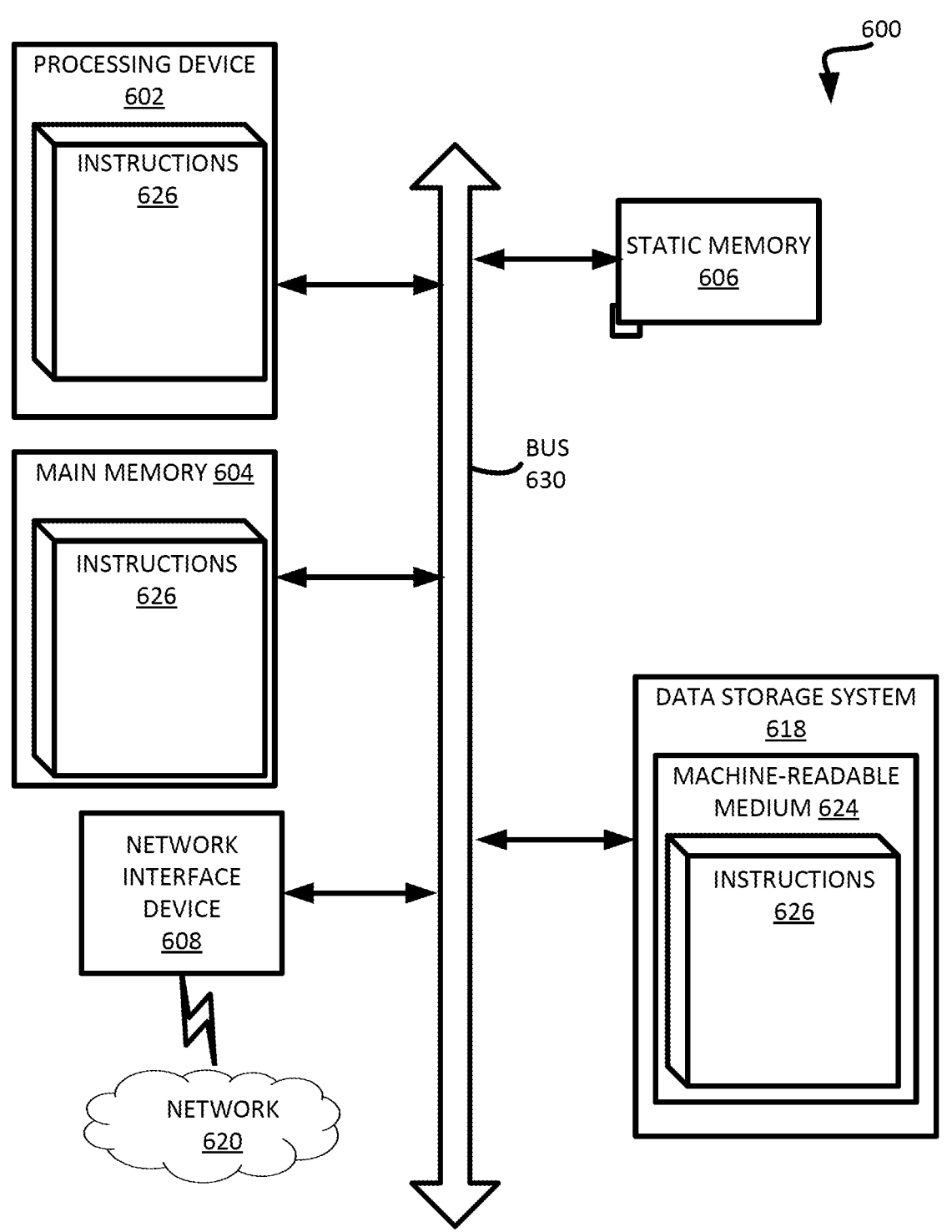
FIG. 6 is an example computer system operating in accordance with one or more aspects of the present disclosure.

FIG. 6 depicts a block diagram of an example computer system 600 operating in accordance with one or more aspects of the present disclosure. In various illustrative examples, computer system 600 may correspond to identity system management server 110 of FIG. 1.

The computer system 600 may be included within a data center or external to a data center. In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 1108.

Processing device 602 may be provided by one or more processors such as a general-purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 608 connected to a network 620. Computer system 600 also may include a video display unit (e.g., an LCD), an alphanumeric input device (e.g., a keyboard), a cursor control device (e.g., a mouse), and a signal generation device (not shown).

Data storage device 616 may include a non-transitory computer-readable storage medium 624 on which may store instructions 626 encoding any one or more of the methods or functions described herein, including instructions for implementing methods 400, 500A, 500B and/or 500C of FIGS. 4-5C, and the identity system management server 110.

Instructions 626 may also reside, completely or partially, within volatile memory 604 and/or within processing device 602 during execution thereof by computer system 600, hence, volatile memory 604, and processing device 602 may also constitute machine-readable storage media.

While machine-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

The methods, components, and features described herein may be implemented by discrete hardware components or may be integrated in the functionality of other hardware components such as ASICS, FPGAs, DSPs, or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. In addition, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general-purpose computer system selectively programmed by a computer program stored in the computer system. Such a computer program may be stored in a computer-readable tangible storage medium.

The methods and illustrative examples described herein are not inherently related to any particular computer or other apparatus. Various general-purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:

defining, by a processing device, at least one security zone comprising an initial set of objects of a computing environment, the computing environment using a hybrid identity system comprising a remote identity system and an on-premises identity system linked to the remote identity system;

identifying, by the processing device, a set of attack paths leading to the at least one security zone, each attack path of the set of attack paths comprising a respective target object accessible via a respective source object through at least one relationship;

determining, by the processing device, whether at least one valid object for inclusion in the at least one security zone exists based on:

a set of candidate objects that are associated by at least one control relationship with at least one object of the initial set of objects, wherein the at least one control relationship indicates certain actions performable by at least one candidate object of the set of candidate objects with respect to the at least one object of the initial set of objects; or a zero-cost attack path of the set of attack paths, wherein the zero-cost attack path comprises the respective source object, and an object of the initial set of objects that corresponds to the respective target object of the zero-cost attack path;

in response to determining that the at least one valid object for inclusion in the at least one security zone exists, adding, by the processing device, the at least one valid object to the initial set of objects; and performing, by the processing device based on the set of attack paths, attack path monitoring and risk mitigation.

2. The method of claim 1, further comprising:

identifying, by the processing device, the set of candidate objects that have the at least one control relationship to the at least one object of the initial set of objects;

determining, by the processing device, whether the at least one valid object for inclusion in the at least one security zone exists within the set of candidate objects; and in response to determining that at least one valid object exists within the set of candidate objects, adding, by the processing device, the at least one valid object to the initial set of objects.

3. The method of claim 1, further comprising:

identifying, by the processing device, the zero-cost attack path from the set of attack paths;

determining, by the processing device, whether the source object of the zero-cost attack path is valid for inclusion in the at least one security zone; and in response to determining that the source object is valid for inclusion in the at least one security zone, adding, by the processing device, all objects of the zero-cost attack path to the initial set of objects.

4. The method of claim 1, wherein performing attack path monitoring and computing environment risk mitigation comprises:

obtaining a set of risk metrics associated with the computing environment;

determining, for each attack path of the set of attack paths, a risk impact on the computing environment risk based on the set of risk metrics;

identifying, from each risk impact, an attack path among the set of attack paths having a greatest risk impact on the computing environment; and addressing the attack path having the greatest risk impact on the computing environment.

5. The method of claim 1, wherein performing attack path monitoring and computing environment risk mitigation comprises:

detecting a change to an attack path of the set of attack paths;

determining a risk for implementing the change;

determining whether the risk satisfies a threshold condition; and in response to determining that the risk satisfies the threshold condition, addressing the change.

6. The method of claim 1, wherein performing attack path monitoring and computing environment risk mitigation comprises:

detecting anomalous behavior originating from an attack path of the set of attack paths;

determining a risk associated with the attack path;

determining whether the risk satisfies a threshold condition; and in response to determining that the risk satisfies the threshold condition, addressing the anomalous behavior.

7. The method of claim 1, wherein performing attack path monitoring and computing environment risk mitigation comprises using an identity risk fabric to at least one of: amplify risk for a first object or reduce risk of a second object.

8. A system comprising:

a memory; and a processing device communicatively coupled to the memory, to perform operations comprising:

defining at least one security zone comprising an initial set of objects of a computing environment, the computing environment using a hybrid identity system comprising a remote identity system and an on-premises identity system linked to the remote identity system;

identifying a set of attack paths leading to the at least one security zone, each attack path of the set of attack paths comprising a respective target object accessible via a respective source object through at least one relationship;

determining whether at least one valid object for inclusion in the at least one security zone exists based on:

a set of candidate objects that are associated by at least one control relationship with at least one object of the initial set of objects, wherein the at least one control relationship indicates certain actions performable by at least one candidate object of the set of candidate objects with respect to the at least one object of the initial set of objects; or a zero-cost attack path of the set of attack paths, wherein the zero-cost attack path comprises the respective source object, and an object of the initial set of objects that corresponds to the respective target object of the zero-cost attack path;

in response to determining that the at least one valid object for inclusion in the at least one security zone exists, adding the at least one valid object to the initial set of objects; and performing, based on the set of attack paths, attack path monitoring and risk mitigation.

9. The system of claim 8, wherein the operations further comprise:

identifying the set of candidate objects that have the at least one control relationship to the at least one object of the initial set of objects;

determining whether the at least one valid object for inclusion in the at least one security zone exists within the set of candidate objects; and in response to determining that at least one valid object exists within the set of candidate objects, adding the at least one valid object to the initial set of objects.

10. The system of claim 8, wherein the operations further comprise:

identifying the zero-cost attack path from the set of attack paths;

determining whether the source object of the zero-cost attack path is valid for inclusion in the at least one security zone; and in response to determining that the source object is valid for inclusion in the at least one security zone, adding all objects of the zero-cost attack path to the initial set of objects.

11. The system of claim 8, wherein performing attack path monitoring and computing environment risk mitigation comprises:

obtaining a set of risk metrics associated with the computing environment;

determining, for each attack path of the set of attack paths, a risk impact on the computing environment risk based on the set of risk metrics;

identifying, from each risk impact, an attack path among the set of attack paths having a greatest risk impact on the computing environment; and addressing the attack path having the greatest risk impact on the computing environment.

12. The system of claim 8, wherein performing attack path monitoring and computing environment risk mitigation comprises:

detecting a change to an attack path of the set of attack paths;

determining a risk for implementing the change;

determining whether the risk satisfies a threshold condition; and in response to determining that the risk satisfies the threshold condition, addressing the change.

13. The system of claim 8, wherein performing attack path monitoring and computing environment risk mitigation comprises:

detecting anomalous behavior originating from an attack path of the set of attack paths;

determining a risk associated with the attack path;

determining whether the risk satisfies a threshold condition; and in response to determining that the risk satisfies the threshold condition, addressing the anomalous behavior.

14. The system of claim 8, wherein performing attack path monitoring and computing environment risk mitigation comprises using an identity risk fabric to at least one of: amplify risk for a first object or reduce risk of a second object.

15. A non-transitory computer readable storage medium comprising instructions that, when executed by a processor, cause the processor to perform operations comprising:

defining at least one security zone comprising an initial set of objects of a computing environment, the computing environment using a hybrid identity system comprising a remote identity system and an on-premises identity system linked to the remote identity system;

identifying a set of attack paths leading to the at least one security zone, each attack path of the set of attack paths comprising a respective target object accessible via a respective source object through at least one relationship;

determining whether at least one valid object for inclusion in the at least one security zone exists based on:

a set of candidate objects that are associated by at least one control relationship with at least one object of the initial set of objects, wherein the at least one control relationship indicates certain actions performable by at least one candidate object of the set of candidate objects with respect to the at least one object of the initial set of objects; or a zero-cost attack path of the set of attack paths, wherein the zero-cost attack path comprises the respective source object, and an object of the initial set of objects that corresponds to the respective target object of the zero-cost attack path;

in response to determining that the at least one valid object for inclusion in the at least one security zone exists, adding the at least one valid object to the initial set of objects; and performing, based on the set of attack paths, attack path monitoring and risk mitigation.

16. The non-transitory computer readable storage medium of claim 15, wherein performing attack path monitoring and computing environment risk mitigation comprises:

obtaining a set of risk metrics associated with the computing environment;

determining, for each attack path of the set of attack paths, a risk impact on the computing environment risk based on the set of risk metrics;

identifying, from each risk impact, an attack path among the set of attack paths having a greatest risk impact on the computing environment; and addressing the attack path having the greatest risk impact on the computing environment.

17. The non-transitory computer readable storage medium of claim 15, wherein performing attack path monitoring and computing environment risk mitigation comprises:

detecting a change to an attack path of the set of attack paths;

determining a risk for implementing the change;

determining whether the risk satisfies a threshold condition; and in response to determining that the risk satisfies the threshold condition, addressing the change.

18. The non-transitory computer readable storage medium of claim 15, wherein performing attack path monitoring and computing environment risk mitigation comprises:

detecting anomalous behavior originating from an attack path of the set of attack paths;

determining a risk associated with the attack path;

determining whether the risk satisfies a threshold condition; and in response to determining that the risk satisfies the threshold condition, addressing the anomalous behavior.

* * * * *